United States Patent
Pessoa et al.

(10) Patent No.: US 7,844,048 B2
(45) Date of Patent: Nov. 30, 2010

(54) SELECTIVE TONE EVENT DETECTOR AND METHOD THEREFOR

(75) Inventors: Lucio F. C. Pessoa, Cedar Park, TX (US); Ahsan U. Aziz, Austin, TX (US); Wen Wu Su, Austin, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 1751 days.

(21) Appl. No.: 10/795,700

(22) Filed: Mar. 8, 2004

(65) Prior Publication Data

US 2005/0195967 A1 Sep. 8, 2005

(51) Int. Cl.
  *H04M 3/00* (2006.01)
(52) U.S. Cl. .................. 379/386; 379/283; 379/377
(58) Field of Classification Search .............. 379/386, 379/390.02; 455/267
See application file for complete search history.

(56) References Cited

U.S. PATENT DOCUMENTS

| | | | |
|---|---|---|---|
| 5,765,125 A | 6/1998 | Daugherty et al. | |
| 6,055,310 A * | 4/2000 | Zhang et al. | 379/406.08 |
| 6,393,124 B1 * | 5/2002 | Tsai et al. | 379/386 |
| 6,504,838 B1 | 1/2003 | Kwan | |
| 6,587,559 B1 * | 7/2003 | Bartkowiak | 379/386 |
| 6,650,627 B1 * | 11/2003 | Goldman | 370/289 |
| 2001/0033648 A1 * | 10/2001 | Ching | 379/377 |
| 2001/0036260 A1 * | 11/2001 | Schulz | 379/390.02 |
| 2002/0076034 A1 * | 6/2002 | Prabhu et al. | 379/390.02 |
| 2003/0076943 A1 | 4/2003 | Das et al. | |
| 2003/0112796 A1 | 6/2003 | Kwan | |
| 2003/0190038 A1 | 10/2003 | Das et al. | |
| 2003/0235295 A1 * | 12/2003 | He et al. | 379/406.01 |
| 2003/0235312 A1 | 12/2003 | Pessoa et al. | |

FOREIGN PATENT DOCUMENTS

| | | |
|---|---|---|
| EP | 1 395 065 A1 | 3/2004 |
| JP | 07-212802 | 8/1995 |
| WO | WO 00/30325 | 5/2000 |

OTHER PUBLICATIONS

Dick, Chris et al.; "Synchronization in Software Radios—Carrier and Timing Recovery Using FPGAs"; IEEE; 2000; pp. 195-204; IEEE.
Werter, Michael J.; "A Digital Phase-Locked Loop for Frequency Detection"; IEEE; 1996; pp. 1252-1255 IEEE.
Padmanabhan, Mukund et al; A Second-Order Hyperstable Adaptive Filter for Frequency Estimation; IEEE Transactions on Circuits and Systems-II: Analog and Digital Signal Processing; Jun. 1993; pp. 398-403; vol. 40, No. 6; IEEE.
IPCT/US05/01777 nternational Search Report and Written Opinion mailed Jul. 8, 2008.
PCT/US05/01777 International Search Report and Written Opinion.

* cited by examiner

*Primary Examiner*—Ahmad F Matar
*Assistant Examiner*—Khai N Nguyen
(74) *Attorney, Agent, or Firm*—Joanna G. Chiu

(57) ABSTRACT

In one embodiment, a tone event detector first determines whether the presence of a tone is indicated on the input signal, and then, based on this determination, selectively determines whether a tone has been detected on the input signal. For example, in one embodiment, tone detection is performed only when the presence of a tone is first indicated, such that if the presence of a tone is not indicated, tone detection need not be performed. This may help reduce complexity of a tone event detector since a simplified method may be used to indicate the presence of a tone, and the more complex algorithms for tone detection may be enabled only when needed. Also, in one embodiment, detection of a tone includes generating one or more tone characteristics corresponding to the detected tone which may then be used to determine whether the detected tone corresponds to a valid tone event.

24 Claims, 13 Drawing Sheets

SELECTIVE TONE EVENT DETECTOR AND METHOD THEREFOR

FIELD OF THE INVENTION

The present invention relates generally to tone event detection, and more specifically, to tone indication, tone detection, and tone event detection.

RELATED ART

Tone event detection is an important application in digital telephony systems having shared data and voice communication over the telephone network. The International Telecommunication Union (ITU) has been developing a standard for data transmission (V-series modem signals) over packet networks (V.150), which defines inter-operation between Public Switched Telephone Network (PSTN) and Internet Protocol (IP) networks. Pior to or during data transmission, a series of tone events are exchanged, so that whenever a tone event is detected, specific actions need to be taken for initiating and maintaining proper data communication over IP.

A tone event may include a single tone or a combination of multiple tone segments having different modulation schemes. For example, a tone event may include a single frequency tone with an on/off amplitude modulation (AM). In another example, a tone event may include a dual frequency component tone followed by a single frequency tone. In yet another example, a tone event may include a single frequency tone having periodic phase changes. Therefore, it is desirable to reliably detect tone events according to different modulation schemes. Some typical tone events that need to be detected include T.30 Calling Tone (CNG), V.25 Calling Tone (CT), V.25 Answering Tone (ANS)/T.30 CED, V.25 Answering Tone with Phase Reversal (ANS_PR), V.8 Answering Tone with Amplitude Modulation (ANSam), V.8 Answering Tone with Amplitude Modulation and Phase Reversal (ANSam_PR), V.22 Unscrambled Binary Ones (USB1), V.21 Channel 2 HDLC flag, TIA/EIA-825 TTY tones, V.8bis Initiate/Respond, Q.24 Dual Tone Multiple Frequency (DTMF), Multiple Frequency Tones (e.g. MFR1, MFR2), etc. These tone events are modulated by magnitude, frequency, or phase, or any combination thereof. Furthermore, these tone events may include more than one frequency component per segment of the signal having the same tone characteristics.

The large number of signaling tones transmitted over digital telephony systems demands different types of tone detectors that can identify predetermined tone events. However, having multiple independent tone detectors running in the system can result in high complexity, and sometimes even result in tone event detection errors. One traditional approach to detect tone events is based on Goertzel Filters, which efficiently estimates the Fourier transform of the signal at specific frequencies. Depending on the range of frequency values, the number of components or timing, the required processing and memory cost can increase significantly, and sometimes lead to undesirable slow detection. Furthermore, tones with low-frequency components (as compared to the sampling rate) may require a large number of samples (thus increasing processing time) in order to be detected using these Goertzel Filters.

BRIEF DESCRIPTION OF THE DRAWINGS

The present invention is illustrated by way of example and not limited by the accompanying figures, in which like references indicate similar elements, and in which.

Skilled artisans appreciate that elements in the figures are illustrated for simplicity and clarity and have not necessarily been drawn to scale. For example, the dimensions of some of the elements in the figures may be exaggerated relative to other elements to help improve the understanding of the embodiments of the present invention.

DETAILED DESCRIPTION OF THE DRAWINGS

As used herein, the term "bus" is used to refer to a plurality of signals or conductors which may be used to transfer one or more various types of information, such as data, addresses, control, or status. The conductors as discussed herein may be illustrated or described in reference to being a single conductor, a plurality of conductors, unidirectional conductors, or bidirectional conductors. However, different embodiments may vary the implementation of the conductors. For example, separate unidirectional conductors may be used rather than bidirectional conductors and vice versa. Also, plurality of conductors may be replaced with a single conductor that transfers multiple signals serially or in a time-multiplexed manner. Likewise, single conductors carrying multiple signals may be separated out into various different conductors carrying subsets of these signals. Therefore, many options exist for transferring signals.

The terms "assert" and "negate" (or "deassert") are used when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

Connectivity

Figure 1:
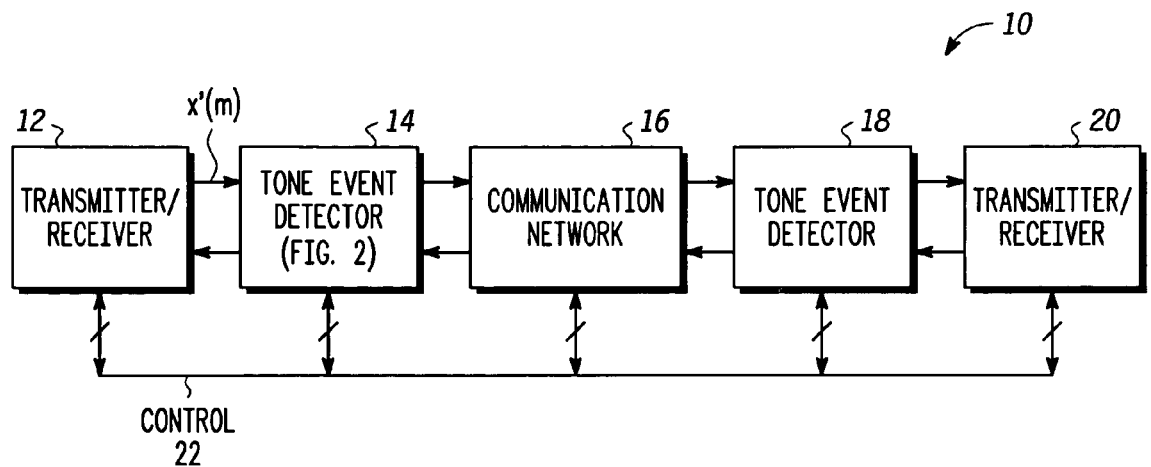
FIG. 1 illustrates, in block diagram form, a communication system in accordance with one embodiment of the present invention.

FIG. 1 illustrates, in block diagram form, a communication system 10 in accordance with one embodiment of the present invention. Communication system 10 includes a transmitter/receiver 12, a tone event detector 14, a communication network 16, a tone event detector 18, a transmitter/receiver 20, and a control bus 22. Control bus 22 is bidirectionally coupled to transmitter/receiver 12, tone event detector 14, communication network 16, tone event detector 18, and transmitter/receiver 20. Transmitter/receiver 12 is bidirectionally coupled to tone event detector 14, which is bidirectionally coupled to communication network 16, which is bidirectionally coupled to tone event detector 18, which is bidirectionally coupled to transmitter/receiver 20.

Figure 2:
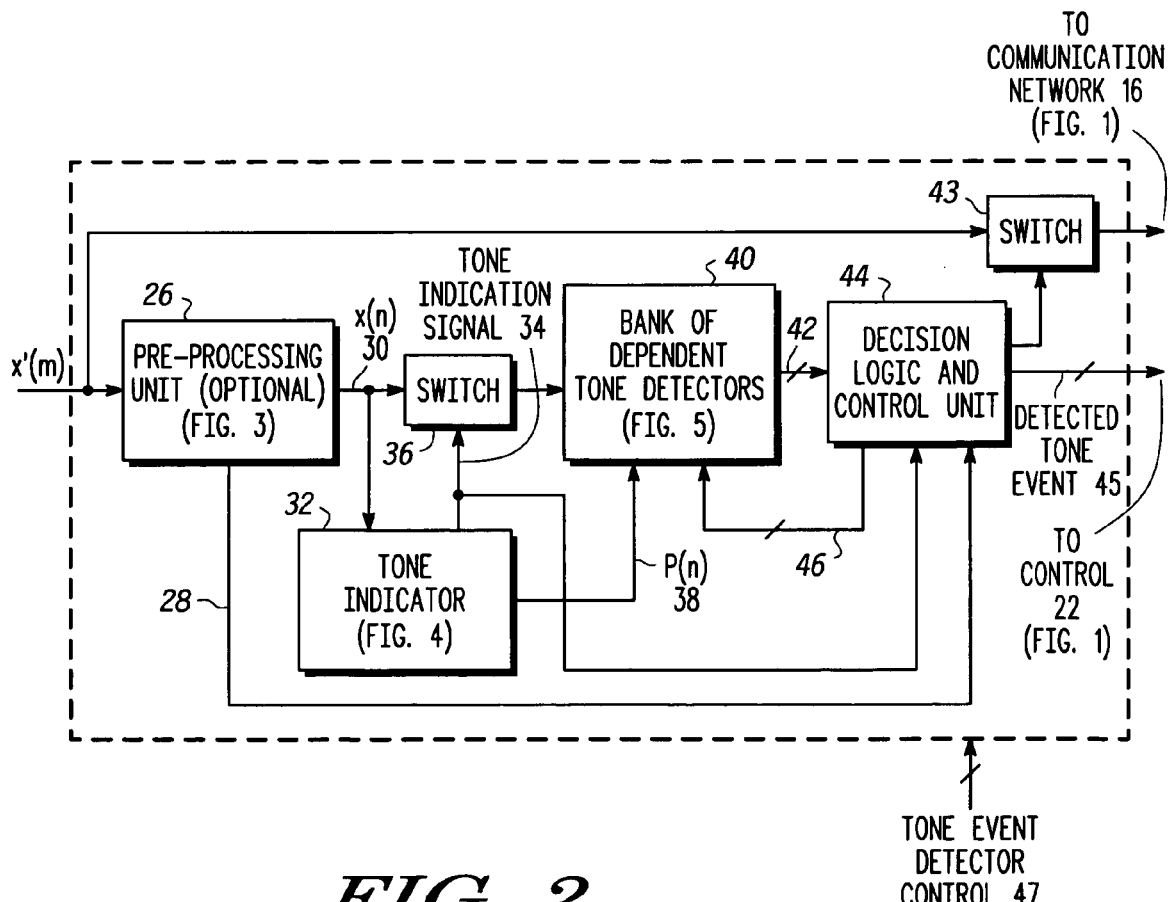
FIG. 2 illustrates, in block diagram form, a tone event detector of the communication system of FIG. 1, in accordance with one embodiment of the present invention.

FIG. 2 illustrates, in block diagram form, tone event detector 14 in accordance with one embodiment of the present invention. Tone event detector 14 includes an optional pre-processing unit 26, a tone indicator 32, switches 36 and 43, bank of dependent tone detectors 40, and decision logic and control unit 44 (which may also be referred to as common control logic 44). Tone event detector 14 receives a sampled input signal x'(m) which is provided to pre-processing unit 26, if present, and to switch 43. Pre-processing unit 26 (if present) is coupled to decision logic and control unit 44 via conductor 28, and provides signal x(n) 30 to tone indicator 32 and switch 36. Note that if pre-processing unit 26 is not present, x'(m) is provided as x(n) 30 to switch 36 and tone indicator 32. Tone indicator 32 provides a tone indication signal 34 to switch 36 and to decision logic and control unit 44, and provides a power indicator, P(n) 38, to bank of dependent tone detectors 40. Bank of tone detectors 40 is coupled to switch 36, to decision logic and control unit 44 via conductors 42 and 46. Decision logic and control unit 44 is coupled to switch 43, and provides a detected tone event signal 45 as an output of tone event detector 14. Note that in one embodiment, detected tone event signal 45 is provided via control bus 22. Alternatively, detected tone event signal 45 may be provided as a separate signal in addition to control 22 or via communication network 16. Tone event detector 14 may be externally controlled via tone event detector control 47 which may be provided via control bus 22.

Figure 3:
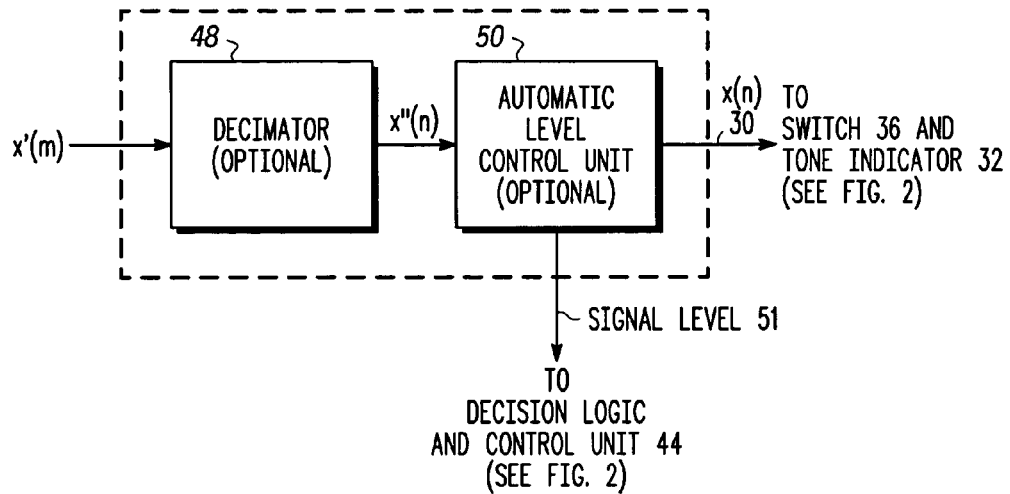
FIG. 3 illustrates, in block diagram form, a pre-processing unit of the tone event detector of FIG. 2, in accordance with one embodiment of the present invention.

FIG. 3 illustrates, in block diagram form, pre-processing unit 26 in accordance with one embodiment of the present invention. Pre-processing unit 26 is optional and includes an optional decimator 48 and an optional automatic level control (ALC) unit 50. Decimator 48 receives x'(m) and generates x"(n) to ALC 50. ALC 50 provides a signal level 51 to decision logic and control unit 44, via, for example, conductor 28 and provides x(n) to switch 36 and tone indicator 32. Note that each of decimator 48 and ALC 50 is optional. Therefore, alternate embodiments may include only one of these units or neither of these units. Alternatively, pre-processing unit 26 may include other units in addition to or instead of decimator 48 and ALC 50 which may, for example, further pre-process or precondition signal x'(m) to produce signal x(n) 30.

Figure 4:
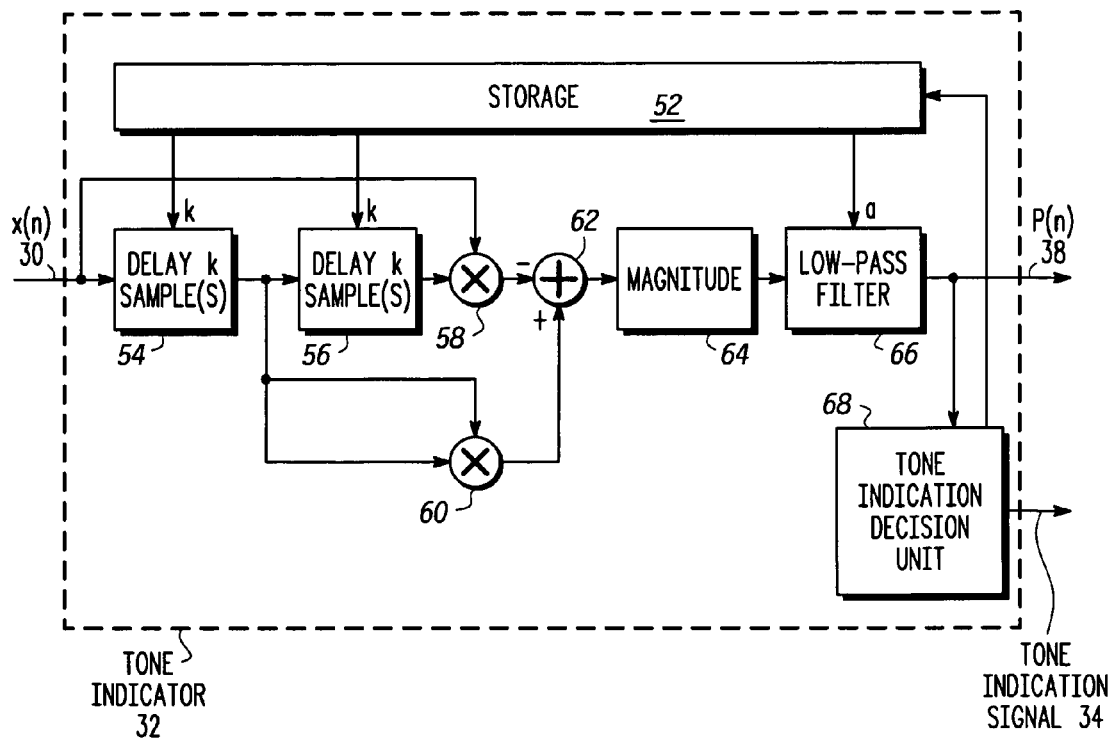
FIG. 4 illustrates, in block diagram form, a tone indicator of the tone event detector of FIG. 2, in accordance with one embodiment of the present invention.

FIG. 4 illustrates, in block diagram form, one embodiment of tone indicator 32 of FIG. 2. Tone indicator 32 includes storage 52, delay units 54 and 56, multipliers 58 and 60, adder 62, a magnitude unit 64, low-pass filter (LPF) 66, and a tone indication decision unit 68. Signal x(n) 30 is provided to delay unit 54 and to multiplier 58. Delay unit 54 is coupled to delay unit 56 and multiplier 60 and receives k from storage 52. Delay unit 56 is coupled to multiplier 58 and also receives k from storage 52. Multiplier 58 and multiplier 60 are coupled to adder 62 which is coupled to magnitude unit 64. Magnitude unit 64 is coupled to LPF 66 which is coupled to tone indication decision unit 68, receives a from storage 52, and provides P(n) 38 to bank of dependent tone detectors 40. Tone indicator decision unit 68 is coupled to storage 52 and provides tone indication signal 34.

Figure 5:
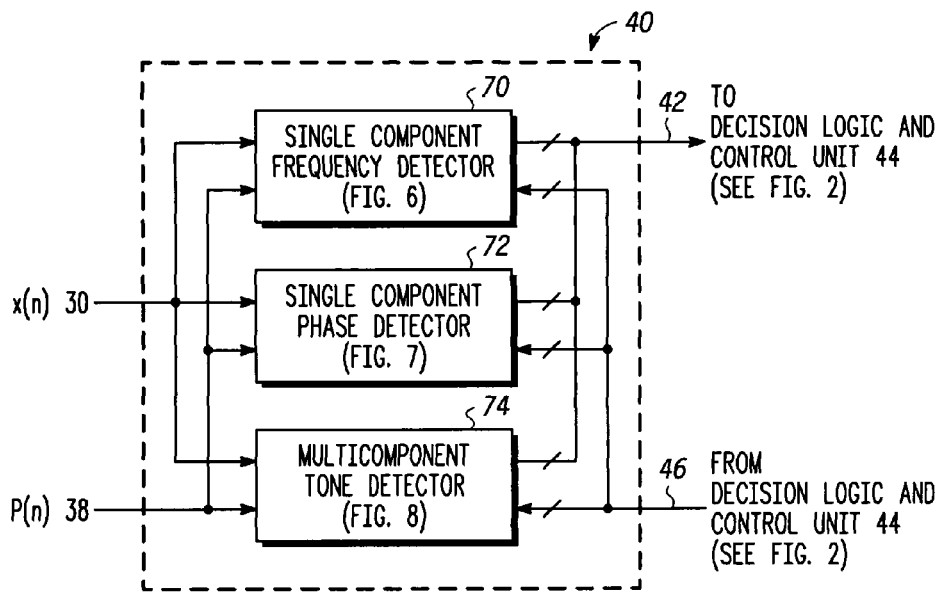
FIG. 5 illustrates, in block diagram form, a bank of dependent tone detectors of the tone event detector of FIG. 2, in accordance with one embodiment of the present invention.

FIG. 5 illustrates, in block diagram form, one embodiment of bank of dependent tone detectors 40 of FIG. 2. Bank of dependent tone detectors 40 includes a single component frequency detector 70, a single component phase detector 72, and a multicomponent tone detector 74. Each of detectors 70, 72, and 74 receives x(n) 30 and provide tone characteristics to decision logic and control unit 44 via, for example, conductors 42. Each of detectors 70, 72, and 74 may also receive information and control from decision logic and control unit 44 via, for example, conductors 46, and may also receive P(n) 38. Note that in alternate embodiments, additional, fewer, or different detectors may be present in bank of dependent tone detectors 40 and each may receive and provide all the signals illustrated in FIG. 5, a subset of the signals, or different signals, as needed. Therefore, as will be described below, bank of dependent tone detectors 40 may include any number of detectors.

Figure 6:
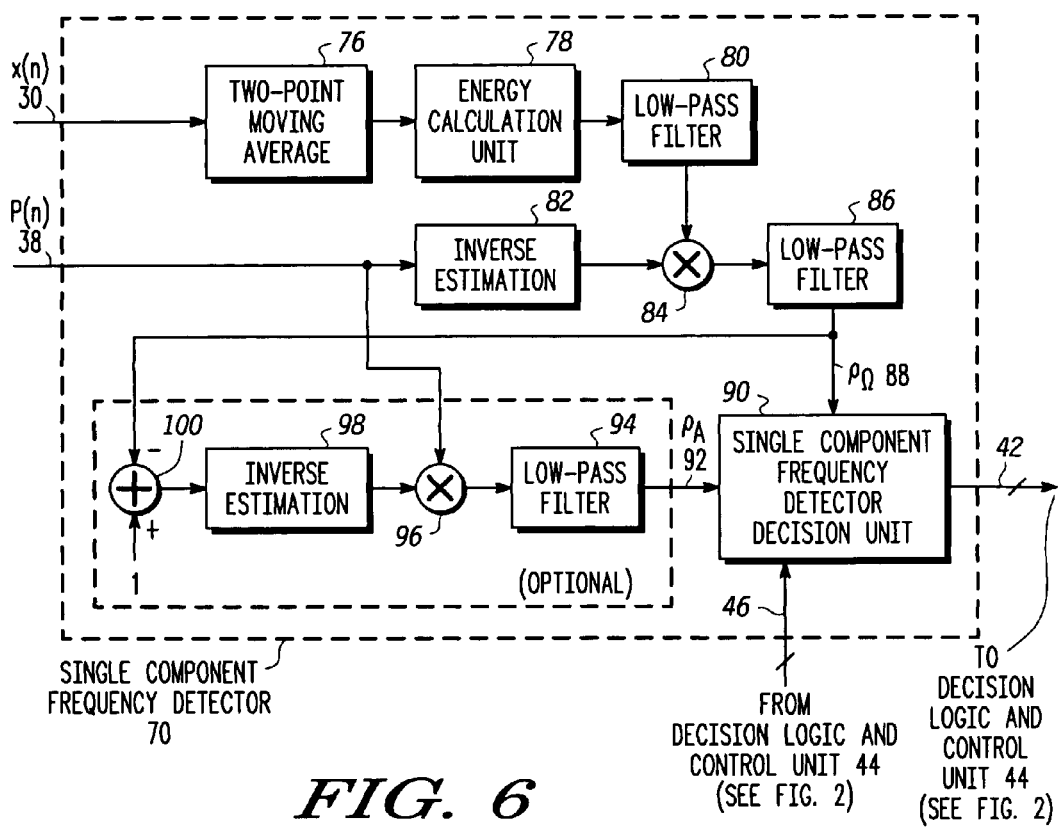
FIG. 6 illustrates, in block diagram form, a single component frequency detector of the bank of dependent tone detectors of FIG. 5, in accordance with one embodiment of the present invention.

FIG. 6 illustrates, in block diagram form, one embodiment of single component frequency detector 70 of FIG. 5. Single component frequency detector 70 includes a two-point moving average unit 76, an energy calculation unit 78, a low-pass filter (LPF) 80, an inverse estimation unit 82, a multiplier 84, a low-pass filter (LPF) 86, an adder 100, an inverse estimation unit 98, a multiplier 96, a low-pass filter (LPF) 94, and a single component frequency detector decision unit 90. Two-point moving average unit 76 receives x(n) 30 and is coupled to energy calculation unit 78 which is coupled to LPF 80 which is coupled to multiplier 84. Inverse estimation unit 82 receives P(n) 38 and is coupled to multiplier 84 which is also coupled to LPF 86. LPF 86 provides $\rho_\Omega$ 88 to single component frequency detector decision unit 90 and to adder 100. Adder 100 also receives a 1 and is coupled to inverse estimation 98 which is coupled to multiplier 96. Multiplier 96 receives P(n) 38 and provides a signal to LPF 94 that generates $\rho_A$ 92 to single component frequency detector decision unit 90 which communicates with decision logic and control unit 44 via conductors 42 and 46.

Figure 7:
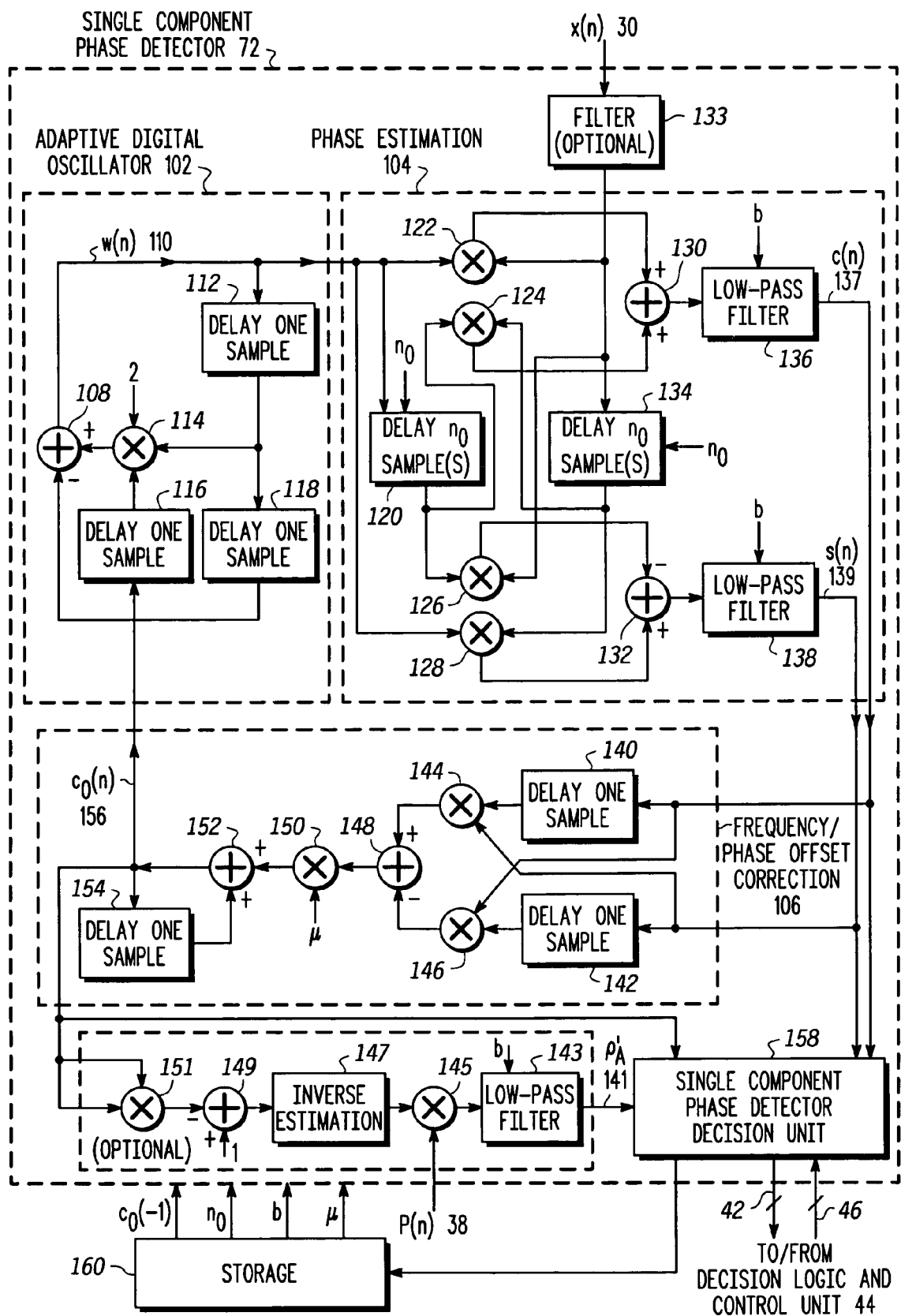
FIG. 7 illustrates, in block diagram form, a single component phase detector of the bank of dependent tone detectors of FIG. 5, in accordance with one embodiment of the present invention.

FIG. 7 illustrates, in block diagram form, one embodiment of single component phase detector 72 of FIG. 5. Single component phase detector 72 includes an adaptive digital oscillator 102 coupled to a phase estimation unit 104 and a frequency/phase offset correction unit 106, which are coupled to a single component phase detector decision unit 158. Adaptive digital oscillator 102 includes delay units 112, 118, and 116, a multiplier 114, and an adder 108. Adder 108 is coupled to multiplier 114 and delay unit 118 and provides a target signal w(n) 110 to delay unit 112 and to phase estimation unit 104. Multiplier 114 receives a 2 and is coupled to adder 108, delay unit 116, and delay units 118 and 112. Phase estimation unit 104 includes delay units 120 and 134, low-pass filters (LPFs) 136 and 138, multipliers 122, 124, 126, 128, and adders 130 and 132. Signal w(n) 110 is provided to multiplier 128, delay unit 120, and multiplier 122. Adder 130 is coupled to multipliers 122 and 124 and LPF 136. Delay unit 120 receives $n_0$ and is coupled to multiplier 124 and multiplier 126. Optional filter 133 is coupled to multiplier 122, delay unit 134, and multiplier 126. The output of delay unit 134 is coupled to multipliers 124 and 128 and receives $n_0$. Adder 132 is coupled to multipliers 126 and 128 and to LPF 138. Each of LPF 136 and 138 receive b. LPF 136 provides c(n) 137 and LPF 138 provides s(n) 139 to single component phase detector decision unit 158. Frequency/phase offset correction 106 includes delay units 140, 142, and 154, adders 148 and 152, and multipliers 150, 144, and 146. Delay unit 140 receives c(n) and is coupled to multiplier 144. Delay unit 142 receives s(n) and is coupled to multiplier 146. Multiplier 144 receives s(n) and is coupled to adder 148. Multiplier 146 receives c(n) and is coupled to adder 148. Multiplier 150 is coupled to adders 148 and 152 and receives µ. Adder 152 is coupled to delay unit 154 and provides $c_0(n)$ 156 to delay unit 116, to delay unit 154, and to single component phase detector decision unit 158. FIG. 7 also includes a storage unit 160 which provides stored values as needed, such as, for example, $c_0(-1)$, $n_0$, b, and µ, and is coupled to single component phase detector decision unit 158. In one embodiment, FIG. 7 also includes an optional magnitude estimator which includes multipliers 151 and 145, adder 149, inverse estimation 147, and LPF 143, and which receives $c_0(n)$ and generates $\rho_A{'}$ 141 to single component phase detector decision unit 158. In this case, multiplier 151 receives two instances of $c_0(n)$ and is coupled to a negative input of adder 149, which receives 1 and is coupled to inverse estimation unit 147, which is coupled to multiplier 145. Multiplier 145 receives P(n) 38 and is coupled to LPF 143. LPF 143 receives b and generates $\rho_A{'}$ 141. Single component phase detector decision unit 158 communicates with decision logic and control unit 44 via conductors 42 and 46 and is coupled to storage 160.

Figure 8:
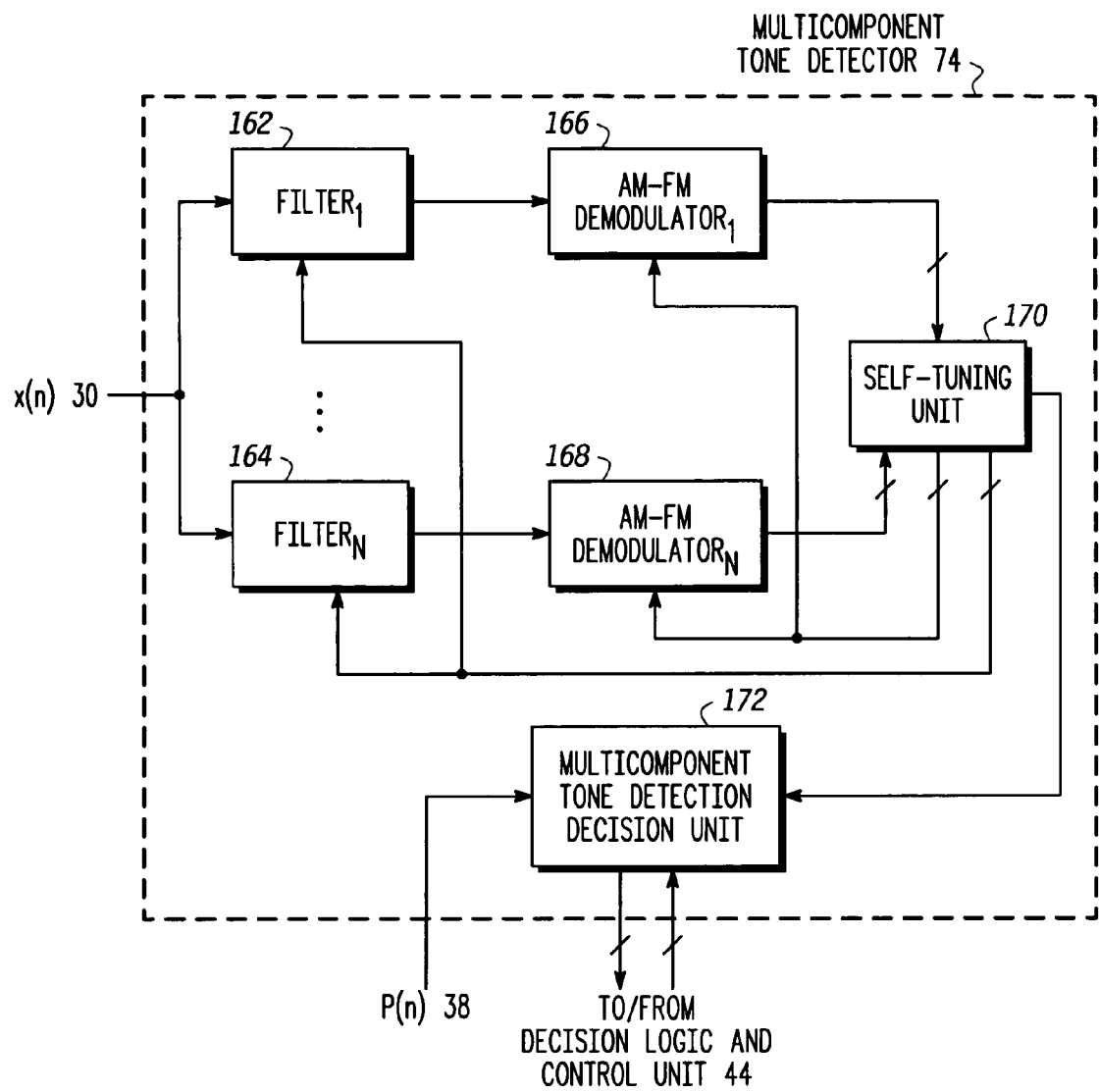
FIG. 8 illustrates, in block diagram form, a multicomponent tone detector of the bank of dependent tone detectors of FIG. 5, in accordance with one embodiment of the present invention.

FIG. 8 illustrates one embodiment of multicomponent tone detector 74 and includes filter₁ 162 through filter$_N$ 164, each receiving x(n) 30 and each coupled to a corresponding one of AM-FM demodulator₁ 166 through AM-FM demodulator$_N$ 168. Self-tuning unit 170 is coupled to demodulators 166 to 168, filters 162 to 164, and to multicomponent tone detection decision unit 172. Multicomponent tone detector decision unit 172 communicates with decision logic and control unit 44 via conductors 42 and 46 and receives P(n) 38.

Figure 9:
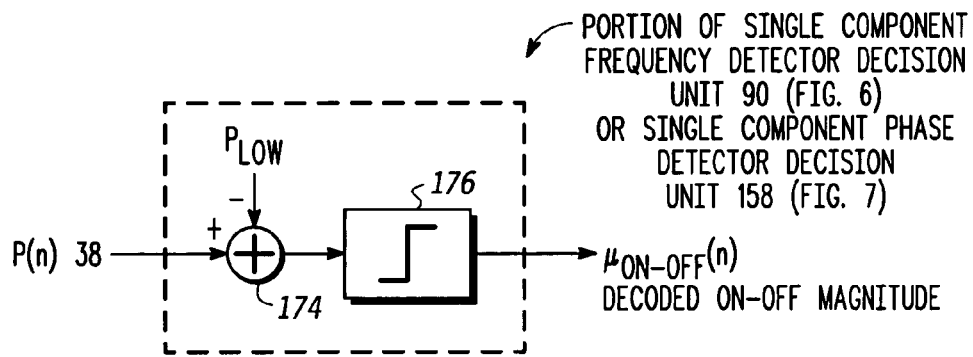
FIGS. 9-12 illustrate, in block diagram form, various embodiments of decoded tone characteristics in accordance with various embodiments of the present invention.

FIG. 9 illustrates one embodiment of a portion of single component frequency detector decision unit 90 which includes an adder 174 which receives P(n) 38 and $P_{LOW}$ and is coupled to a step function 176, which then generates decoded ON-OFF magnitude $\mu_{ON\text{-}OFF}(n)$. Note that as used herein, a step function U(y) is equal to 1 for all values of y>0, and is equal to 0 otherwise. Alternate embodiments may define a step function differently.

Figure 10:
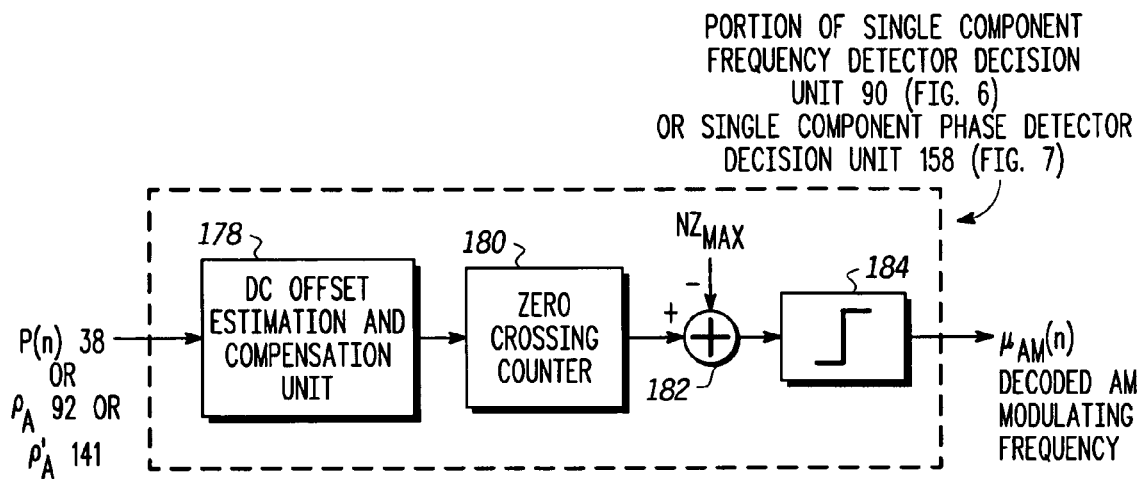

FIG. 10 illustrates one embodiment of a portion of single component frequency detector decision unit 90 or of single component phase detector decision unit 158 (or of both 90 and 158) which includes a DC offset estimation and compensation unit 178 which receives P(n) 38 or $\rho_A$ 92 or $\rho_A{'}$ 141 (or any combination thereof) and is coupled to a zero crossing counter 180 which is coupled to an adder 182. Adder 182 receives $NZ_{max}$ and is coupled to a step function 184, which then generates decoded AM modulating frequency $\mu_{AM}(n)$.

Figure 11:
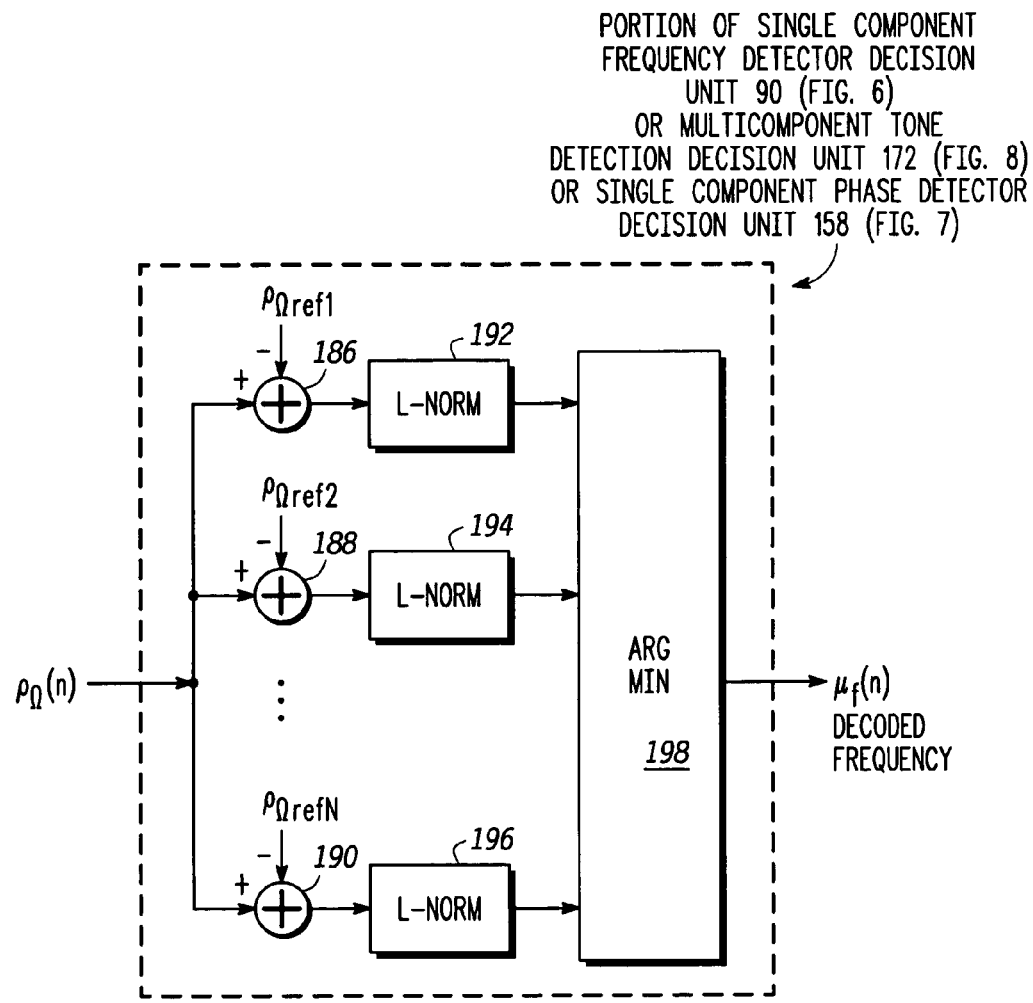

FIG. 11 illustrates one embodiment of a portion of single component frequency detector decision unit 90, of multicomponent tone detector decision unit 172, or of single component phase detector decision unit 158 (or of any two or more of 90, 172, and 158) which includes adders 186 to 190, each receiving $\rho_\Omega(n)$, a corresponding reference value (one of $\rho_{\Omega ref1}$ to $\rho_{\Omega refN}$), and is coupled to a corresponding one of L-norm 192 to 196. Each of L-norm 192 to 196 is coupled to arg min 198, which then generates decoded frequency $\mu_f(n)$.

Figure 12:
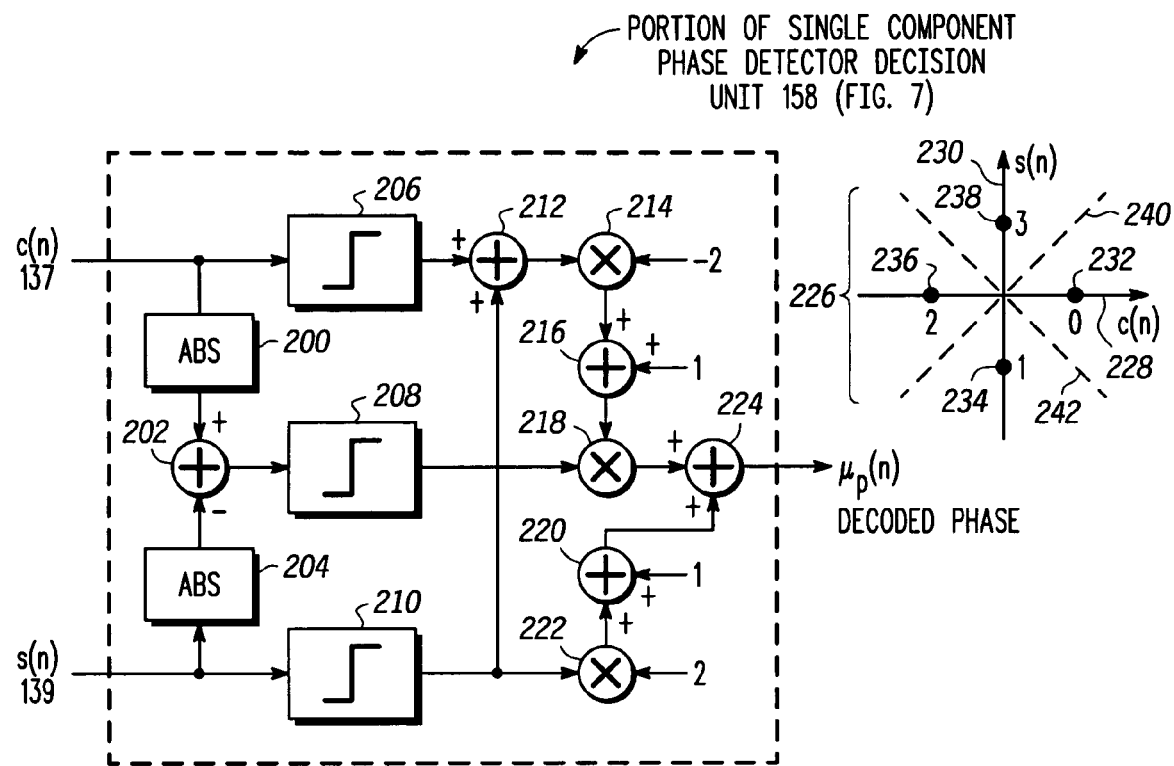

FIG. 12 illustrates one embodiment of a portion of single component phase detector decision unit 158 which includes an ABS unit 200, ABS unit 204, adders 202, 212, 216, 224, and 220, step functions 206, 208, 210, and multipliers 214, 218, and 222. Signal c(n) 137 is provided to step function 206 and ABS 200. Signal s(n) 139 is provided to ABS 204 and step function 210. ABS 204 and ABS 200 are coupled to adder 202 which is also coupled to step function 208. Adder 212 is coupled to step function 206, step function 210, and multiplier 214. Multiplier 214 receives a −2 and is coupled to adder 216, which receives a 1 and is coupled to multiplier 218. Multiplier 218 is coupled to step function 208 and adder 224. Multiplier 222 receives a 2 and is coupled to step function 210 and adder 220, which receives a 1 and is coupled to adder 224. Adder 224 receives the outputs from multiplier 218 and adder 220, and generates decoded phase $\mu_p(n)$. Notice that given the signals c(n) 137 and s(n) 139, the corresponding phase information can be mapped to a bi-dimensional space having independent axes c(n) 228 and s(n) 230. The decoded phase information corresponds to one of the quantized reference points 232, 234, 236 and 238, denoted by 0, 1, 2, and 3, respectively. In the current embodiment, the decision boundaries 240 and 242 assume that the decoded phase values are equally probable. Depending on the application, it is well known by those skilled in the art that alternative decision boundaries may be defined, in which case FIG. 12 may contain more or less blocks than those illustrated.

Note that FIGS. 1-12 illustrate one embodiment of blocks found within communication system 10. Alternate embodiments may include various different elements than those illustrated, more elements than those illustrated or less elements than those illustrated, depending on the functionality desired. Furthermore, the blocks within FIGS. 1-12 can be grouped differently or connected differently and still achieve similar results. Therefore, FIGS. 1-12 are only meant to provide examples used to illustrate the concepts that will be discussed below. Also, although the connections in FIGS. 1-12 may have been drawn as a single conductor (unidirectional or bidirectional) or as multiple conductors (unidirectional or bidirectional), a variety of different connections may be used. For example, a multiple conductor can be replaced with a variety of different single unidirectional or bidirectional conductors. Similarly, single conductors can be expanded into multiple unidirectional or bidirectional conductors. Signals can be communicated serially via a single conductor or can be communicated in parallel via multiple conductors. Also, signals can be time multiplexed via single or multiple conductors. Therefore, the connections illustrated in FIGS. 1-12 can be implemented in a variety of different ways while still achieving the desired functionality. Also, as will be described further below, the designs of FIGS. 1-12 can be implemented in hardware, software, or a combination of hardware and software. Note also that the storage units such as storage 52 and 160 may be included anywhere within tone event detector 14, or alternatively, may be external to tone event detector 14.

Operation

As will be described herein, a tone event detector may be used to detect tone events on an input signal (such as, for example, a sampled input signal). In one embodiment, the tone event detector first determines whether the presence of a tone is indicated on the input signal, and then, based on this determination, selectively determines whether a tone has been detected on the input signal. For example, in one embodiment, tone detection is performed only when the presence of a tone is first indicated, such that if the presence of a tone is not indicated, tone detection need not be performed. This multistage process may help reduce complexity of a tone event detector since a simplified method may be used to indicate the presence of a tone, and the more complex algorithms for tone detection may be enabled only when needed (such as only when the presence of a tone has first been indicated). Also, in one embodiment, detection of a tone includes generating one or more tone characteristics corresponding to the detected tone, where these tone characteristics may provide frequency information, timing information, phase information, modulation information, magnitude information, etc., or any combination thereof. These tone characteristics may then be used to determine whether the detected tone corresponds to a valid tone event.

Referring back to FIG. 1, transmitter/receiver 12 provides and receives data signals via tone event detector 14 to communication network 16. Similarly, transmitter/receiver 20 provides and receives data signals via tone event detector 18 to communication network 16. Therefore, transmitter/receiver 12 and 20 are able to communication with each other through communication network 16. Transmitter/receiver 12 and transmitter/receiver 20 can each be any device used for communicating over communication network 16, such as, for example, a telephone, a modem, etc. Also, communication network 16 may include a packet telephony network (including, for example, voice over internet protocol (IP), data over packet, asynchronous transfer mode (ATM), etc., and could either apply to wireless or wireline systems) or Public Switching Telephone Network (PSTN). In alternate embodiments, communication system 10 may refer to any type of communication system.

Control bus 22 provides a control pathway among transmitter/receiver 12 and 20, tone event detectors 14 and 18, and communication network 16. Control signals transmitted via control bus 22 are generally not in-line signals. For example, control bus 22 may include an enabling/disabling signal to enable or disable tone detector 14 or 18, or may include signals that need to be communicated among various portions of tone detector 14 or 18. Control 22 may also include a signal to indicate whether the telephone is on or off the hook. Also note that control 22, as will be described in more detail below, may include an encoded version of the transmit signal such as, for example, according to the RFC2833 standard.

Note that operation of transmitter/receiver 12 and tone event detector 14 is analogous to the operation of transmitter/receiver 20 and tone event detector 18. That is, communication system 10, as illustrated in FIG. 1, is symmetrical. Therefore, the descriptions of FIGS. 2-12 will be made in reference to transmitter/receiver 12 and tone event detector 14; however, it should be understood that the descriptions also apply to transmitter/receiver 20 and tone event detector 18. Furthermore, although embodiments of the current invention will be presented using the transmit signal, tone event detection can be performed on either transmit or receive signals (i.e. signals going to or coming from the communication network). In FIG. 1, transmitter/receiver 12 provides a send or transmit signal, labeled x'(m) to tone detector 14. Signal x'(m) can include normal speech or can include a tone event according to a particular modulation scheme, such as AM, Frequency Shift Keying (FSK), Differential Phase Shift Keying (DPSK), etc.

For example, a TTY phone enables voice and text communication over a communication network such as communication network 16. A TTY phone typically includes a built in keyboard which allows for text communication. That is, for each key pressed, a corresponding character string is generated. The generated character string corresponds to an FSK modulated tone event. For example, when using a TTY phone, any pressed key will generate a tone event having seven (7) FSK modulated tones including a start bit tone, 5 data bit character set tones, and a stop bit tone. Therefore, note that in this case, a tone event includes seven individual tone segments. In one case (such as, for example, when the communication network is a packet telephony network), information relating to the tone event is transmitted to a receiver so that the tone event can be re-created locally at the receiver side. That is, in this case, upon the transmitter (for example, transmitter 12) detecting a start bit tone generated by the TTY phone, the transmitter may suppress the remaining tones until a tone event is detected, at which point, the transmitter sends information relating to the tone event to a receiver (for example, receiver 20) which can then locally re-create the tone event from the sent information. In one case, this information is transmitted over control lines such as control bus 22 rather than via the communication network. Alternatively, the information or the tones of the tone event can be sent directly over the communication network.

FIG. 2 illustrates, in block diagram form, tone event detector 14 of FIG. 1 in accordance with one embodiment of the present invention. Signal x'(m) is provided to optional preprocessing unit 26 and to switch 43. In one embodiment, signal x'(m) is sampled at an 8 kHz sampling rate and processed in blocks. For example, signal x'(m) may be processed in 10 millisecond (ms) blocks of 80 samples each. In one embodiment, tone event detector 14 operates in multiple stages (as will be further described in reference to the state diagram of FIG. 13) including: (1) scanning the signal with a tone indicator, (2) identifying tone characteristics (which may include one or more stages), and (3) detection of a tone event based on the identified tone characteristics, where a tone event is mapped into a set of tone characteristics defining the tone event.

In one embodiment, tone event detector 14 may include a pre-processing unit 26 which may decimate transmit signal x'(m), apply an automatic level control to boost or decrease the signal level, or both. The output of pre-processing unit 26, x(n) 30, is provided to tone indicator 32 which scans signal x(n) with a tone indicator (which will be described in more detail in reference to FIG. 4). Pre-processing unit 26 also provides the amount of signal level scaling introduced by automatic level control unit 50, if present, via conductor 28 so that the correct signal level is estimated by decision logic and control unit 44. Note that if pre-processing unit 26 is not present, transmit signal x'(m) is provided directly as x(n) 30.

If the presence of a tone is indicated by tone indicator 32, tone indication signal 34 is provided to enable or close switch 36 such that x(n) 30 is provided to bank of dependent tone detectors 40. However, if tone indicator 32 does not indicate the presence of a tone, tone indication signal 34 is provided to disable or open switch 36 so as to disable or bypass bank of dependent tone detectors 40. Tone indication signal 34 is also provided to decision logic and control unit 44, which can help validate a tone event or detect interruption of a current tone event. Also, if no tone is indicated by tone indication signal 34, switch 43 is enabled by decision logic and control unit 44 such that x'(m) is supplied directly to communication network 16, thus bypassing bank of dependent tone detectors 40. In an alternative embodiment, switch 43 may be implemented using a filtering operation that removes only the tone event portion of x'(m). If the presence of a tone is indicated by tone indicator 32 via tone indication signal 34, bank of dependent tone detectors 40 is enabled (via switch 36) and provides tone characteristics (and other related control signals, if any) via conductors 42 to decision logic and control unit 44 which can use the received tone characteristics to determine if a valid tone event is detected. (Also note that other related intra-tone event detector control signals may be communicated back from decision logic and control unit 44 to bank of dependent tone detectors 40 via conductors 46.)

Therefore, in one embodiment, a tone is not detected or identified until tone indicator 32 has at least indicated the presence of a tone. Thus, note that as used herein, tone indication refers to determining whether the presence of a tone is indicated, and tone detection refers to more fully identifying the indicated tone (such as, for example, by generating tone characteristics of the indicated tone). In this manner, processing time and complexity may be reduced since a simpler method may be used to indicate the presence of a tone as compared to the more complex algorithms for tone detection, which can be enabled only when needed (such as only when the presence of a tone has first been indicated). Therefore, referring to FIG. 2, the tone detectors of bank of dependent tone detectors 40 may be enabled only when the presence of a tone has already been indicated, thus reducing processing time and complexity. Furthermore, note that, in one embodiment, each of the tone detectors in bank of dependent tone detectors 40 may be independently enabled as needed. Also note that different embodiments may include any number of tone detectors in bank of dependent tone detectors 40 which provide any type of tone characteristic, as needed. For example, the tone characteristics output by one or more of the detectors in bank of dependent tone detectors 40 may include frequency information for the detected tone, phase information for the detected tone, amplitude or magnitude information for the detected tone, modulation information for the detected tone, timing information for the detected tone, etc., or any combination thereof.

Decision logic and control unit 44, based on the tone characteristics received from bank of dependent tone detectors 40 via conductors 42, can determine whether a valid tone event is detected (where, as mentioned above, a valid tone event may include one or more tones and be defined according to a variety of different protocol schemes.) If a valid tone event is detected, decision logic and control unit 44 provides indication of the detected tone event to communication network 16 via, for example, control 22. In one embodiment, the tone event itself is not transmitted via the communication network. Instead, information relating to the tone event is transmitted via control 22 such that the tone event detector local to the receiving side of the network can locally generate the tone event based on the received information relating to the detected transmitted tone event. In this manner, the received tone event does not need to be communicated via the communication network. Alternatively, the detected tone event may be communicated via communication network 16 either in addition to or instead of providing information via control 22.

Figure 13:
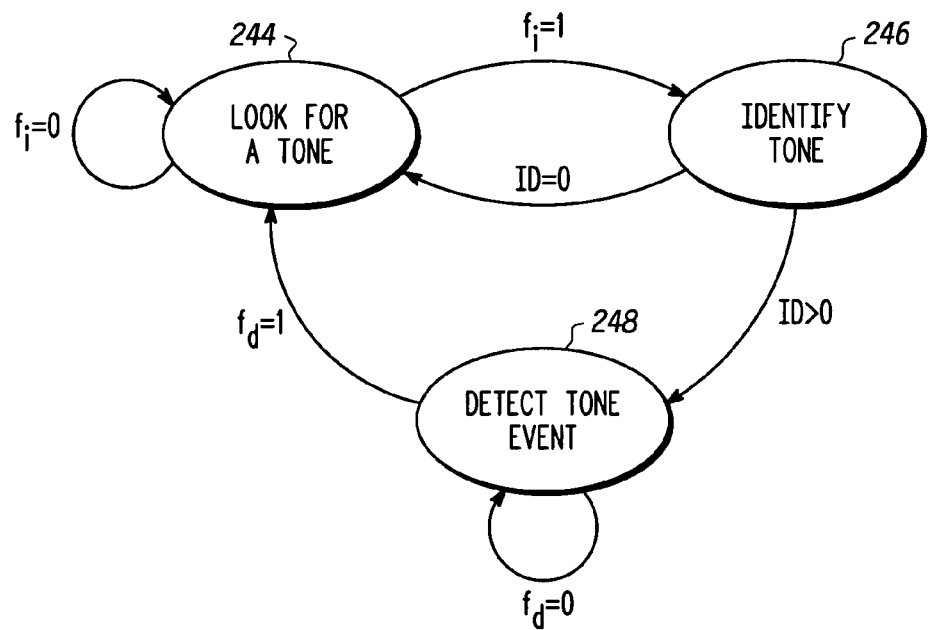
FIG. 13 illustrates a state machine corresponding to a multiple stage detection flow corresponding to operation of the tone event detector of FIG. 2, in accordance with one embodiment of the present invention.
Figure 14:
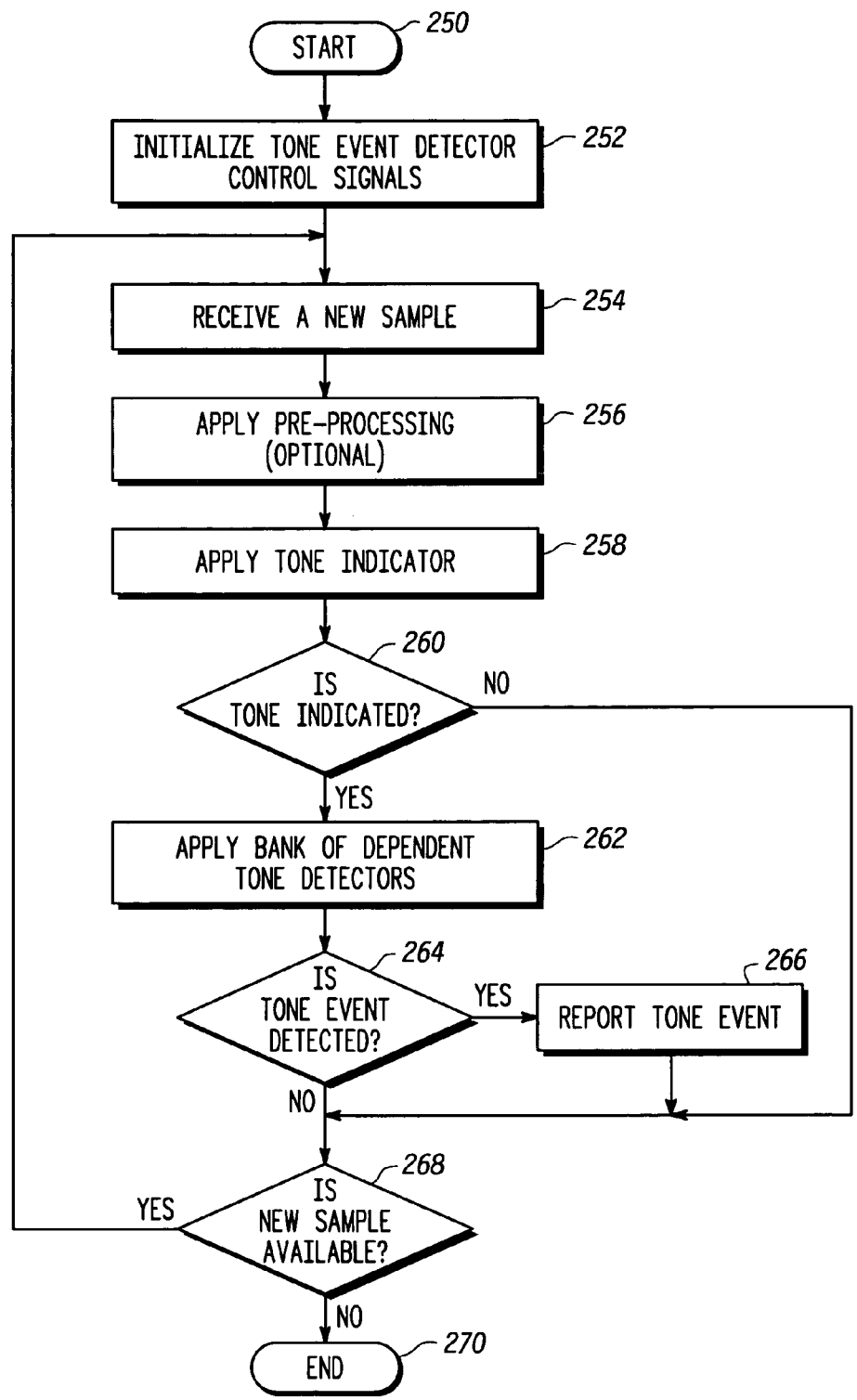
FIG. 14 illustrates, in flow diagram form, a method of tone event detection in accordance with one embodiment of the present invention.

Operation of FIG. 2 can also be described in reference to FIGS. 13 and 14. Referring to FIG. 13, when a tone is not currently being indicated, then tone event detector 14 is in state 244 where it is looking for the presence of a tone. If a tone is not indicated, then a tone indication flag $f_i$ is cleared ($f_i=0$). Once a tone is indicated (by, for example, tone indicator 32), the state machine transitions from state 244 to a state 246 in which a tone is identified. Upon identifying a tone (by, for example, bank of tone detectors 40), and ID of greater than 0 is assigned to that tone (by, for example, bank of dependent tone detectors 40) and the state machine transition to a state 248 in which a tone event is detected. However, if a tone is not identified (or if a detected tone is invalid), an ID of 0 is assigned to the invalid tone and the state machine transitions back from state 246 to state 244 where the tone indication flag is cleared. In state 248, once a tone event is detected (by, for example, decision logic and control unit 44), a tone event detection flag is set ($f_d=1$) and the state machine transitions back to state 244. Also, note that if an invalid tone event is detected, the state machine also transitions to state 244 and the tone event detection flag is also set ($f_d=1$). That is, regardless of whether a valid tone event is detected or if the tone event is deemed invalid, the state machine transitions back to 244, setting $f_d$ to 1. Whenever a valid tone event is detected, its corresponding identification is then provided from tone event detector 14 to control 22. While a tone event is not detected, the state machine remains in state 248 with tone event detection flag remaining cleared ($f_d=0$).

Referring to FIG. 14, flow begins with start 250 and proceeds to block 252 where tone event detector control signals are initialized. Flow then proceeds to block 254 where a new sample of the input signal is received. Flow then proceeds to block 256 where pre-processing may be optionally applied, as described above with reference to optional pre-processing unit 26. Flow then proceeds to block 258 where a tone indicator is applied. If, at decision diamond 260, a tone is not indicated, flow proceeds to decision diamond 268 where it is determined if a new sample is available. If so, flow returns to block 254, and if not, flow ends at end 270. However, if, at decision diamond 260, a tone is indicated, flow proceeds to block 262 where a bank of dependent tone detectors is applied to determine if a valid tone is detected, where a valid tone may indicate all or a portion of a tone event. After block 262, flow proceeds to decision diamond 264 where it is determined if a valid tone event is detected. If detected, flow proceeds to block 266 where the detected tone event identification is reported. For example, when a TTY tone event is detected, the reported tone event identification could be the corresponding TTY encoded character and signal level. If not, flow proceeds to decision diamond 268.

Referring back to FIG. 2, note that a pre-processing may be used to precondition x'(m) and thus produce x(n). If present, pre-processing unit 26 can perform different types of preprocessing of input signal x'(m) to produce preconditioned signal x(n). FIG. 3 illustrates one embodiment of pre-processing unit 26 of FIG. 2. In the illustrated embodiment, pre-processing unit includes an optional decimation and level control.

In one embodiment, as illustrated in FIG. 3, pre-processing unit 26 decimates x'(m) to produce a decimated and level-adjusted signal x(n), where n corresponds to the decimated sample index. Therefore, note that the flow of FIG. 14 described above (such as block 258, decision diamond 260, block 262, decision diamond 264, and block 266) may be performed every y samples wherein y corresponds to the subrate introduced by decimator 48. For example, in one embodiment, y=2 such that x(n) has a reduced sampling rate of 4 kHz as compared to the 8 kHz sampling rate of x'(m). In this manner, decimator 48 may be used to reduce computation complexity such that only every y-th sample is processed. Note that y can be any value (including 1, which indicates that sub-rate processing is not used because every sample is processed, i.e. m=n). Therefore, every y-th sample may be considered as a sub-rate sample. Therefore, in the equations used herein, x(n) will be used where if decimator 48 is present, n refers to the sub-rate sample and if decimator 48 is not present, n refers to the same index value as m.

Automatic level control unit 50 may be used in order to improve the dynamic range by amplifying the input samples. In one embodiment, the level or gain of x'(n) is monitored before amplification such that it can be reduced if needed to avoid clipping. Automatic level control unit 50 may also be used to reduce the level x'(m) to avoid clipping. Pre-processing unit 26 also provides the amount of signal level scaling introduced by automatic level control unit 50, if present, via signal level 51 so that the correct signal level is estimated by decision logic and control unit 44. In one embodiment, signal level 51 is provided via conductor 28.

Figure 15:
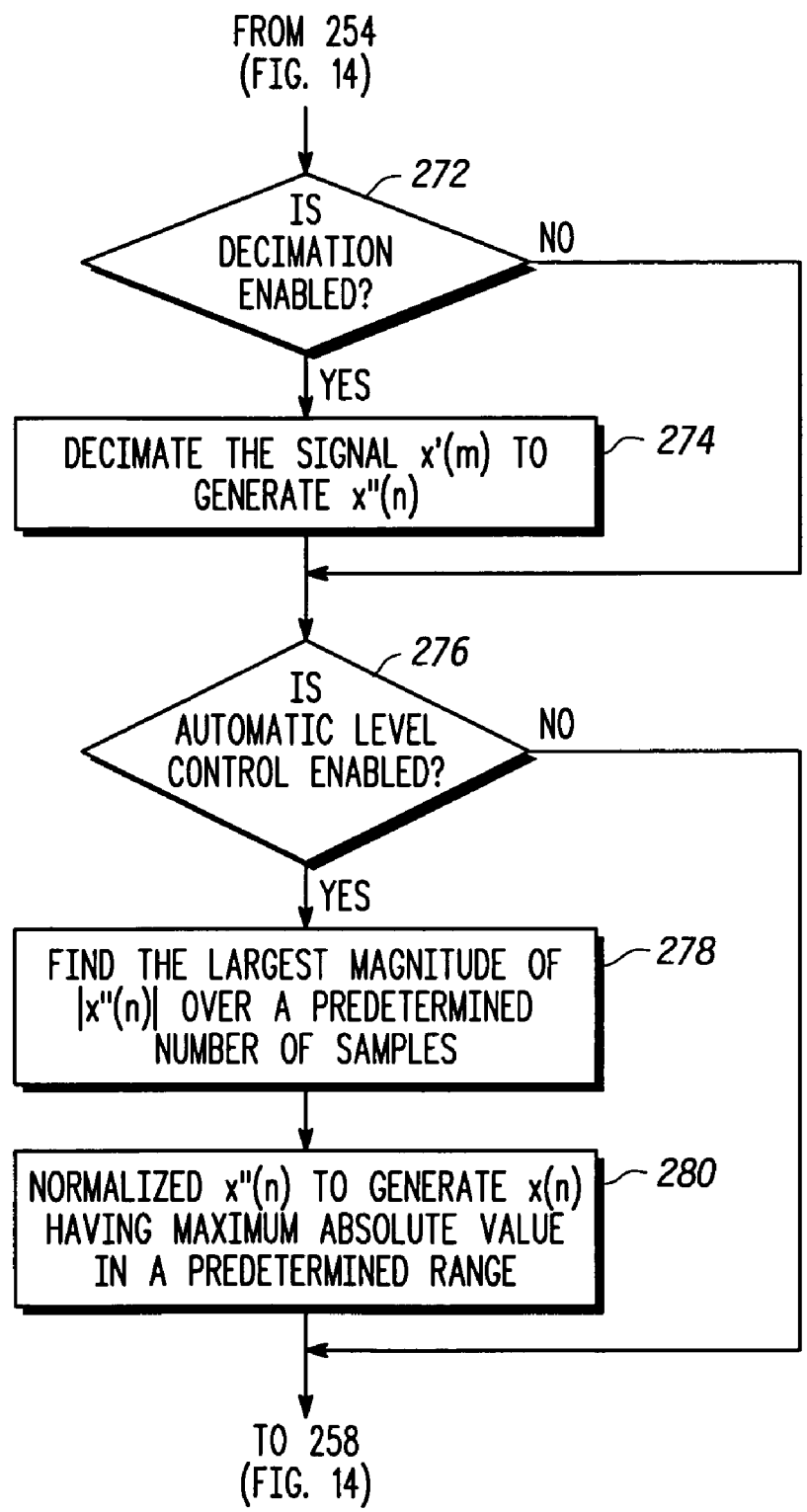
FIG. 15 illustrates, in flow diagram form, a method for pre-processing a received signal in accordance with one embodiment of the present invention.

Operation of optional pre-processing unit 26 can be further understood in reference to FIG. 15 which illustrates a portion of block 256 of FIG. 14. At decision diamond 272, if decimation is enabled (e.g. if decimator 48 is present), flow proceeds to block 274 where the signal x'(m) is decimated to generate x''(n) and flow proceeds to decision diamond 276. If, at decision diamond 272, decimation is not enabled (e.g. if decimator 48 is not present), flow proceeds to decision diamond 276. At decision diamond 276, if automated level control is enabled (e.g. if automatic level control unit 50 is present), flow proceeds to block 278 where the largest magnitude of |x''(n)| over a predetermined number of samples (i.e. sub-rate samples, if decimation is enabled) is determined. Flow then proceeds to block 280 where x''(n) is normalized to generate x(n) such that its maximum absolute value is within a predetermined range. Flow then proceeds to block 258 of FIG. 14. Also, if at decision diamond 276, automatic level control is not enabled (e.g. if automatic level control unit 50 is not present), flow proceeds to block 258 of FIG. 14.

Figure 16:
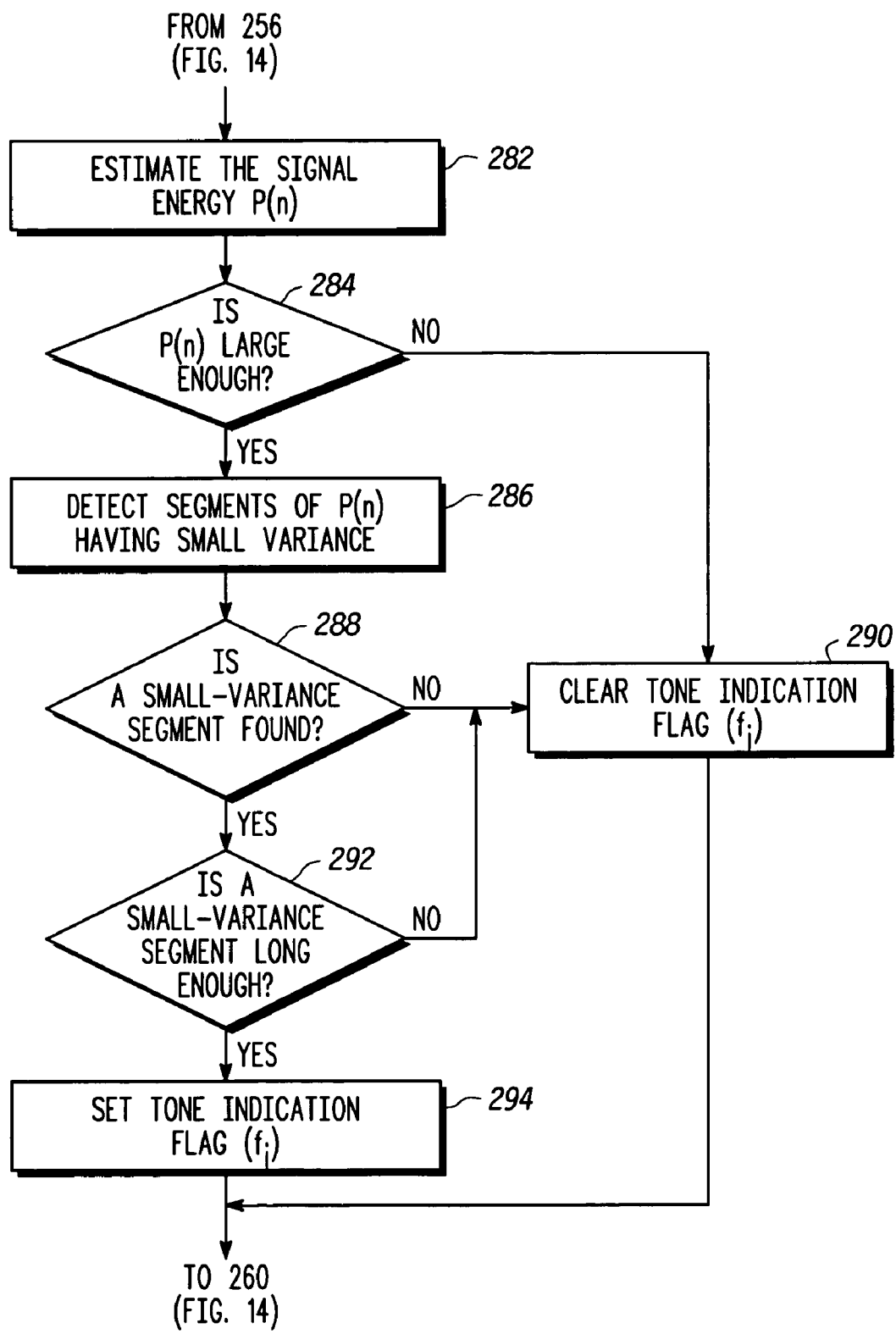
FIG. 16 illustrates, in flow diagram form, a method for tone indication in accordance with one embodiment of the present invention.

FIG. 4 illustrates one embodiment of tone indicator 32 of FIG. 2, which will be described in reference to FIG. 16. However, note that in alternate embodiments, any method for indicating the presence of a tone may be used. The illustrated embodiment of FIG. 4 uses polynomial filters such as a modified version of the Teager-Kaiser filter for indicating the presence of a sinusoidal signal of any frequency. Note that any appropriate polynomial filter may be used. The polynomial filter illustrated in FIG. 4 is just one example.

FIG. 4 includes one embodiment which maps any single-frequency tone to a constant via a modified energy operator. That is, a single-frequency tone can be expressed as follows.

$$x(n)=A\cos(\Omega n+\phi) \quad \text{Equation 1}$$

The modified energy operator, $\Psi_k$, can be expressed as follows.

$$\Psi_k(x(n))=x^2(n-k)-x(n)x(n-2k)=A^2\sin^2(k\Omega), k=1, 2, \ldots \quad \text{Equation 2}$$

In the above equation, note that x(n) corresponds to x(n) 30 and $x^2(n-k)-x(n)x(n-2k)$ corresponds to the output of adder 62 in FIG. 4 (i.e. the output of delay 54 is x(n−k), the output of delay 56 is x(n−2k), the output of multiplier 58 is x(n)x(n−2k), the output of multiplier 60 is $x^2(n-k)$, and the output of adder 62 is the sum of the output of multiplier 60 and the negative of the output of multiplier 58). By substituting x(n) of equation 1 into $x^2(n-k)-x(n)x(n-2k)$, the result $A^2 \sin^2(k\Omega)$ is obtained. Therefore, note that $\Psi$ depends both on the magnitude A and the normalized frequency $\Omega$ of the tone ($\Omega=2\pi f/f_s$, where f is the tone frequency and $f_s$ is the sampling frequency, which, in one embodiment that utilizes decimation, may correspond to the subrate). Note that $\Psi_k(x(n))$ does not depend on the initial phase $\phi$, but does generate a short-term transient upon abrupt phase changes, which may be used to indicate phase changes in the communication signal x(n).

The power of x(n)30 (equation 1) can be expressed using the following equation.

$$\text{Power}_{x(n)}=A^2/2 \quad \text{Equation 3}$$

Therefore, note that $\Psi_k(x(n))$ provides the power of x(n) scaled by $2\sin^2(k\Omega)$, such that:

$$\Psi_k(x(n))=\text{Power}_{x(n)}*2\sin^2(k\Omega) \quad \text{Equation 4}$$

Solving for $\text{Power}_{x(n)}$ in terms of $\Psi_k(x(n))$ therefore provides the following equation:

$$\text{Power}_{x(n)}=\Psi_k(x(n))\csc^2(k\Omega)/2 \quad \text{Equation 5}$$

However, in practice, signal x(n) 30 may be corrupted by noise, resulting in a noisy estimation $\Psi\text{noisy}_k(x(n))$. Any low pass filter can then be used to smoothen the result, such as, for example, a single-pole low pass filter. Therefore, as can be seen in FIG. 4, tone indicator 32 includes a low-pass filter 66 which receives the output of magnitude 64 (corresponding to the absolute value of the output of adder 62) and a from storage 52, and provides a smooth estimate P(n) of $\Psi\text{noisy}_k(x(n))$. P(n) can be expressed with the following equation.

$$P(n)=\alpha P(n-1)+(1-\alpha)|x^2(n-k)-x(n)x(n-2k)| \quad \text{Equation 6}$$

In the above equation, $\alpha$ is a smoothing parameter (0<a<1) that controls the bandwidth of the smoothing low pass filter. Note that either a fixed or variable smoothing parameter, $\alpha$, may be used. P(n) 38 (at the output of LPF 66 in FIG. 4) is then provided to tone indication decision unit 68 of FIG. 4 which indicates whether a tone is present based on the variance of the estimate P(n), as will be described in more detail below in reference to FIG. 16. P(n) 38 is also provided to bank of dependent tone detectors 40.

When x(n) 30 is a tone, the variance of P(n) 38 will be very small. That is, a constant level of P(n) 38, corresponding to a small variance of P(n) 38, is expected whenever a single-frequency tone is present on x(n) 30. Therefore, tone indication decision unit 68 looks for a segment of P(n) 38 in which the variance is low which provides an indication of the presence of a tone on x(n) 30. For example, referring to FIG. 16, flow begins with block 282 (from block 256 of FIG. 14) where the signal energy P(n) is estimated. (Note that the above descriptions provided one example of how to estimate P(n), but alternate embodiments may use different methods to estimate the signal energy other than by using a Teager-Kaiser method.) Flow then proceeds to decision diamond 284 where it is determined whether P(n) is large enough to proceed. That is, P(n) should be large enough to indicate the presence of a signal on x(n). If not, then flow proceeds to block 290 where the tone indication flag ($f_t$) is cleared and flow proceeds to block 260 of FIG. 14.

If P(n) is large enough, then flow proceeds to block 286 where segments of P(n) which have small variances are detected. If, at decision diamond 288, a small-variance segment is not found, flow proceeds to block 290 where $f_t$ is cleared and then to block 260 of FIG. 14. However, if a small-variance segment is found, flow proceeds to decision diamond 292 where it is determined if the small-variance segment is sufficiently long. That is, if a tone is present on x(n), P(n) should remain fairly constant (i.e. having a very small variance or having a variance less than a predetermined amount of variance, where the predetermined amount of variance may be determined based on the expected number of tone components) for a sufficiently long time. If the time is not sufficiently long (i.e. is not greater than a predetermined duration), then flow proceeds to block 290 where the $f_t$ is cleared. In this case, it is assumed that the length of the small-variance segment of P(n) was too small to indicate the possibility of the presence of a tone on x(n). In one embodiment, the required minimum segment duration (having small P(n) variance) depends on the sampling rate, the noise levels, the low-pass filter control parameters and the types of tone events to be detected. In one embodiment, it needs to be long enough for reliable indication of a tone segment, but not longer than the duration of the shortest tone event.

If, at decision diamond 292, the small-variance segment is determined to be sufficiently long, then flow proceeds to block 294 where $f_t$ is set ($f_t$=1). Therefore, in block 294, the tone indication flag is set to indicate that the presence of a tone was detected. Note that decision diamonds 284, 288, and 292 and blocks 286, 290, and 294 may all be performed by tone indication decision unit 68. In one embodiment, when the tone indication flag is set, tone indication signal 34 is asserted to indicate to bank of dependent tone detectors 40 and switch 36 that the presence of a tone has been detected. Alternatively, the tone indication flag and tone indication signal 34 may be a same indicator. Therefore, upon detection of the presence of a tone at block 294, tone detection is enabled (e.g. by closing switch 36 and enabling bank of dependent tone detectors 40. Note that in the illustrated embodiment, bank of dependent tone detectors 40 is selectively enabled or disabled on a per-sample basis (at the sampling rate or at the sub-rate if decimation is used) and need not be fully enabled throughout operation. In this manner, individual tone detectors may be enabled or disabled on a per-sample basis rather than on a per-block basis, resulting in more reliable and frequent decisions than the prior art. That is, in prior art systems, decisions are made on a block by block basis, where a block may be 10 milliseconds long, having 80 samples. However, the ability to enable or disable the tone detectors on a per-sample basis may improve performance and flexibility by allowing changes on a per sample basis. Also, the ability to selectively enable or disable the detectors based on tone indication may allow for significant reduction in complexity and power consumption.

FIG. 5 illustrates one embodiment of bank of dependent tone detectors 40 of FIG. 2. The illustrated embodiment includes three detectors: single component frequency detector 70 (which will be described further in reference to FIG. 6), single component phase detector 72 (which will be described further in reference to FIG. 7), and a multicomponent tone detector (which will be described further in reference to FIG. 8). Alternate embodiments may include any number and any type of detectors. Each of the detectors in FIG. 5 receives x(n) 30 and P(n) 38 and provide tone characteristics to decision logic and control unit 44 via conductors 42. Detectors 70, 72, and 74 may also receive information from decision logic and control unit 44 via conductors 46 and may also communicate information among each other. That is, the detectors may be dependent on each other, or may operate independently of each other. In the illustrated embodiment, each of detectors 70, 72, and 74 are dependent in that they can share information and can be adapted based on information from other detectors. (Detectors 70, 72, and 74 will be described in more detail in reference to FIGS. 6-12.)

FIG. 6 illustrates one embodiment of single component frequency detector 70 of FIG. 5. The illustrated embodiment receives x(n) 30 and P(n) 38 and provides a frequency component of the detected tone ($\rho_\Omega$) to single component frequency detector decision unit 90, and, if needed, provides an amplitude component of the detected tone ($\rho_A$) to single component frequency detector decision unit 90. Referring to FIG. 6, x(n) 30 is provided to two-point moving average unit 76 whose output is provided to energy calculation unit 78. Note that depending on the magnitude A of the input tone on x(n), the energy operator described above, $\psi_k(\bullet)$, generates different levels for the same normalized frequency Ω. Therefore, in order to estimate Ω, this magnitude dependency needs to be removed (i.e. extracted). Therefore, two-point moving average unit 76 is used to remove the magnitude dependency from the incoming signal. This can be done as shown in equation 7 below.

$$\frac{1}{2}(x(n-d_1)+x(n-d_2))  \qquad \text{Equation 7}$$

Note that in the above equation, $d_1$ represents a first delay value and $d_2$ represents a second delay value such that an average is determined between two samples of x(n) spaced "$d_1-d_2$" apart. Energy calculation unit 78 then determines the energy of the two-point moving average received from two-point moving average unit 76, as seen in the following equation.

$$\psi_k\left(\frac{1}{2}(x(n-d_1)+x(n-d_2))\right) \qquad \text{Equation 8}$$

Note that P(n) 38 (the energy of x(n) determined by tone indicator 32 and, in one embodiment, corresponding to the modified Teager-Kaiser energy operator described above) is provided to inverse estimation 82. Alternatively, note that the energy of x(n) 30 may be calculated within single component frequency detector and may be calculated according to different methods.

The output of energy calculation unit 78 is provided to LPF 80. LPF 80 may be implemented as a single pole filter and operates to remove noise from the signal in order to achieve better tone detection. P(n) 38 is provided to multiplier 96 and inverse estimation unit 82. Inverse estimation unit 82 is therefore used to estimate $1/P(n) \approx 1/\psi_k(x(n))$.

The outputs of LPF 80 and inverse estimation unit 82 are provided to multiplier 84 whose output is provided to LPF 86 in order to smooth the result. Therefore, the output of LPF 86 provides $\rho_\Omega$, which can be expressed as follows.

$$\rho_\Omega = \frac{\psi_k\left(\frac{1}{2}(x(n-d_1)+x(n-d_2))\right)}{\psi_k(x(n))} = \cos^2\left(\left(\frac{d_1-d_2}{2}\right)\Omega\right) \qquad \text{Equation 9}$$

Note that if $d_1-d_2$ is selected such that $d_1-d_2=2k$, the value of $\rho_\Omega$ can be used to determine $\rho_A$ (if necessary). That is, in alternate embodiments, if the amplitude components ($\rho_A$) are not needed, multiplier 100, inverse estimation 98, multiplier 96, and LPF 94 may not be present. In the illustrated embodiment, the output of LPF 86 ($\rho_\Omega$) is provided to adder 100 so that it may be subtracted from 1 to produce $1-\rho_\Omega$. The output of adder 100 is provided to inverse estimation unit 98, which estimates $1/(1-\rho_\Omega)$ and provides this result to multiplier 96. Multiplier 96 multiplies P(n) 38 (which, in one embodiment, may correspond to $\psi_k(x(n))$) with the output of inverse estimation unit 98 and provides the result to LPF 94 in order to smooth the result. Therefore, the output of LPF 94 provides PA which can be expressed as follows:

$$\rho_A = \frac{\psi_k(x(n))}{1-\rho_\Omega} \approx A^2 \qquad \text{Equation 10}$$

In Equation 10, it is assumed that $d_1-d_2=2k$ and the results of Equations 1, 2 and 9 are valid for the input signal x(n) 30. Note that the trigonometric identity $\sin^2(k\Omega)+\cos^2(k\Omega)=1$ is also employed.

Each of LPFs 80, 86, and 94 receives the parameter α (not illustrated in FIG. 6), which influences the bandwidth of the low pass filters. If its value is close to 1, it will decrease the bandwidth. Therefore, different values of α may be used depending on the bandwidth desired. For example, one embodiment uses two values for α, depending on the bandwidth desired. Alternatively, depending on the tone format, different values for α may be used for each filter.

Also note that one embodiment of inverse estimation units 82 and 98 uses a polynomial approximation to compute a ratio q=N/D between a numerator N and a denominator D, as shown in the following equation.

$$q = \frac{N}{D} = \frac{2N}{2D} = \frac{2N}{2D2^b 2^{-b}} = N\left(\frac{1}{2D2^b}\right) 2^{b+1} = Np(D')2^{b+1} \quad \text{Equation 11}$$

In the above equation $D'=D2^b$ is the denominator normalized to the range between ½ and 1, b is the corresponding number of leading bits of the normalization, and p(•) is a polynomial approximation of the function $f(x)=\frac{1}{2}x$ for $\frac{1}{2} \leq x \leq 1$. In the current embodiment, a third order polynomial is selected, such that:

$$q = N(a_3 + D'(a_2 + D'(a_1 + D'a_0)))2^{b+4} \approx \frac{N}{D} \quad \text{Equation 12}$$

In the above equation, the coefficients are normalized to a range between −1 and +1 resulting in an additional 3 shifts (i.e. $2^{b+1}$ changes to $2^{b+4}$). One embodiment uses the following normalized coefficients: $a_0=-0.2248$, $a_1=0.6695$, $a_2=-0.7357$, and $a_3=0.3532$. Therefore, inverse estimation units 82 and 98 can use this approximation to efficiently and effectively estimate the inverse.

Referring to FIG. 6, $\rho_\Omega$ and $\rho_A$ are provided to single component frequency detector decision unit which may provide these actual values as outputs to decision logic and control unit 44 (via, for example, conductors 42) or may use these values to output tone characteristics in a different format, as will be described in reference to FIGS. 9-11 which illustrate various embodiments that may be used alone or in combination within single component frequency detector decision unit 90 to provide tone characteristics such as, for example, a decoded frequency, an AM modulating frequency, a decoded on-off magnitude indicator, etc.

FIG. 7 illustrates one embodiment of single component phase detector 72 of FIG. 5. The illustrated embodiment receives x(n) 30 and provides phase components, c(n) 137 and s(n) 139, of the detected tone to single component phase detector decision unit 158. Detector 72 includes an adaptive digital oscillator 102 which, based on a control input signal $c_0(n)$, provides a target signal w(n) 110 which attempts to match the frequency of the incoming signal x(n) 30. Target signal w(n) 110 and incoming signal x(n) 30 are provided to phase estimation 104. (Note that detector 72 may include an optional filter 133 which may be used to filter x(n) 30 prior to performing phase estimation. For example, in one embodiment, depending on the tone format used, filter 133 may be used to remove neighboring frequency components, if any, from x(n) 30. Therefore, note that the discussions of x(n) 30 with respect to FIG. 7, refer to either x(n) 30 or filtered x(n) 30, depending on the presence of a filter such as filter 133.) Phase estimation 104 provides phase components, c(n) and s(n), to single component phase detector decision unit 158, where the phase components can be represented as c(n)+js(n) such that s(n)/c(n) is approximately $\tan(\phi(n))$, where $\phi(n)$ is the estimated phase of x(n) 30 (or the output of optional filter 133, if present). Therefore, the phase components, c(n) and s(n), provide an indication of the phase of the input signal x(n) 130. For example, the following equations may be used to represent x(n) and w(n), where x(n) and w(n) are converted to complex signals X(n) and W(n), respectively:

$$X(n) = A e^{j(\Omega n + \phi(n))} \quad \text{Equation 13}$$

$$W(n) = e^{j(\Omega n)} \quad \text{Equation 14}$$

Therefore, note that w(n) should match the frequency, Ω, of x(n). By multiplying X(n) by the complex conjugate of W(n), the phase, $\phi(n)$, of x(n) can be obtained as follows:

$$Z(n) = X(n) \cdot W^*(n) = e^{j\phi(n)} \quad \text{Equation 15}$$

In the above equation, Z(n) may correspond to the outputs of adders 130 and 132, which are passed through LPFs 136 and 138, respectively, to provide $R(n)=LPF\{Z(n)\}=c(n)+js(n)$.

In the illustrated embodiment of FIG. 7, note that the output of adaptive digital oscillator 102, i.e. target signal w(n) 110, can be expressed as follows.

$$w(n) = 2c_0(n-1)w(n-1) - w(n-2) \quad \text{Equation 16}$$

That is, multiplier 114 receives the output of delay 112 (corresponding to w(n−1)), the output of delay 116 (corresponding to $c_0(n-1)$), and a 2 and provides "$2c_0(n-1)w(n-1)$" to adder 108 which also receives the output of delay 118 (corresponding to w(n−2) since the input to delay 118 is the output of delay 112) and subtracts it from the output of multiplier 114 to produce w(n) as given above in Equation 16. Since the frequency of w(n) should match the frequency of x(n), $c_0(n)$ can be set or controlled such that this occurs. In one embodiment, $c_0(n)$ can be a constant value. For example, in one embodiment, $c_0(n)=c_0=\cos(\Omega)$, corresponding to the target frequency. However, in the illustrated embodiment, $c_0(n)$ is updated on a per-sample basis by frequency/phase offset correction 106 which updates $c_0(n)$ based on c(n), s(n), and a step-size μ. Frequency/phase offset correction 106 will be described in more detail below.

Note that, for a given fixed value of $c_0(n)$, the corresponding equations for x(n) and w(n) can be expressed as follows:

$$x(n) = Re\{X(n)\} = A \cos(\Omega n + \phi(n)) \quad \text{Equation 17}$$

$$w(n) = Re\{W(n)\} = \cos(\Omega n) \quad \text{Equation 18}$$

Note also that a sine wave can be obtained by delaying a cosine wave by π/2. Therefore, by letting $n_o=\lceil \pi/(2\Omega) \rceil$, which corresponds to a phase delay of approximately π/2, the following sine waves can be obtained:

$$x(n-n_o) \approx A \sin(\Omega n + \phi(n)) \quad \text{Equation 19}$$

$$w(n-n_o) \approx \sin(\Omega n) \quad \text{Equation 20}$$

Therefore, $n_0$ is provided to delays 120 and 134 of phase estimation 104 in FIG. 7 such that the output of delay 120 corresponds to $w(n-n_0)$ and the output of delay 134 corresponds to $x(n-n_0)$. Still referring to phase estimation 104 of FIG. 7, c(n) 137 and s(n) 139 can be expressed as follows:

$$c(n) = bc(n-1) + (1-b)[x(n)w(n) + x(n-n_0)w(n-n_0)] \text{ for } 0 < b < 1 \quad \text{Equation 20}$$

$$s(n) = bs(n-1) + (1-b)[x(n-n_0)w(n) - x(n)w(n-n_0)] \text{ for } 0 < b < 1 \quad \text{Equation 21}$$

That is, note that the output of multiplier 124 provides "$x(n-n_0)w(n-n_0)$" to adder 130 which also receives "$x(n)w(n)$" from multiplier 122. Therefore, adder 130 provides "$x(n)w(n)+x(n-n_0)w(n-n_0)$" to LPF 136, which, in the illustrated embodiment, is illustrated as a single pole low-pass filter having parameter b where $0<b<1$. Similarly, multiplier 126 provides "$x(n)w(n-n_0)$" to a negative input of adder 132, which also receives "$x(n-n_0)w(n)$" from multiplier 128. Therefore, adder 132 provides "$x(n-n_0)w(n)-x(n)w(n-n_0)$" to LPF 138, which, in the illustrated embodiment, is illustrated as a single pole low-pass filter having parameter b where $0<b<1$. Note that $c(n)$ corresponds to the low pass filtered version of the real part of $Z(n)$ and $s(n)$ corresponds to the low pass filtered version of the imaginary part of $Z(n)$, where $Z(n)$ is provided above in Equation 15.

As stated above, note that $w(n)$ is supposed to track $\cos(\Omega n)$ to match the frequency of $x(n)$ 30. However, $x(n)$ 30 (see Equation 17 above) may include a frequency offset such that $\Omega=\Omega_0+\Delta\Omega$, where $\Delta\Omega$ corresponds to the frequency offset and where $\Omega_0$ corresponds to the frequency of the target signal $w(n)$. If there is a frequency offset, then $c(n)$ and $s(n)$ will be varying over time (i.e. from sample to sample). That is $c(n)$ and $s(n)$ will be rotating over time and in order to prevent $c(n)$ and $s(n)$ from varying over time, the rotation needs to be removed. This can be accomplished by adjusting the frequency of the adaptive digital oscillator 102 which can be done by properly adjusting $c_0(n)$ at the input of delay 116 rather than simply selecting a fixed value (i.e. a constant) for $c_0(n)$. Therefore, as mentioned above, the illustrated embodiment of FIG. 7 updates $c_0(n)$ as needed to ensure that $c(n)$ and $s(n)$ do not vary or rotate from sample to sample.

As described above, $R(n)=LPF(Z(n))=c(n)+js(n)$. Note that the phase different between the previous sample and the current sample of $R(n)$ provides an indication of the frequency offset $\Delta\Omega$. That is, if this phase difference is a positive value, then $c_0(n)$ should be increased (i.e. the frequency of the digital oscillator should be decreased) for the next sample and if the phase difference is a negative value, then $c_0(n)$ should be decreased (i.e. the frequency of the digital oscillator should be increased) for the next sample. The phase difference (E(N)) between the previous sample and the current sample of $R(n)$ can be estimated by multiplying $R(n)$ by the complex conjugate of $R(n-1)$, as follows.

$$E(n)=R(n)R^*(n-1) \qquad \text{Equation 22}$$

It can be shown that the imaginary part of $E(n)$ is a multiple of $\sin(\Delta\Omega)$. Therefore, $c_0(n)$ can be adjusted accordingly, depending on this phase difference estimate (E(n)) as follows:

$$c_0(n)=c_0(n-1)+\mu\text{Imag}\{E(N)\} \text{ for } 0<\mu<1 \qquad \text{Equation 23}$$

Referring to FIG. 7, the output of delay 140 provides "$c(n-1)$" to multiplier 144 which also receives "$s(n)$" and provides "$c(n-1)s(n)$" to adder 148. The output of delay 142 provides "$s(n-1)$" to multiplier 146 which also receives "$c(n)$" and provides "$c(n)s(n-1)$" to the negative input of adder 148. Therefore, adder 148 provides "$c(n-1)s(n)-c(n)s(n-1)$" (which corresponds to the imaginary portion of E(n)) to multiplier 150. Multiplier 150 multiplies the imaginary portion of E(n) with $\mu$ and provides "$\mu\text{Imag}\{E(n)\}$" to adder 152. Adder 152 adds "$\mu\text{Imag}\{E(n)\}$" with "$c_0(n-1)$" at the output of delay 154 to provide the adjusted value of $c_0(n)$ according to the Equation 23 above. Therefore, note than $c(n)$ and $s(n)$ may be used to adapt the control signal $c_0(n)$. Note also that $c_0(n)$ may also be considered a tone characteristic that may be provided via single component phase detector decision unit 158 to decision logic and control 44, as needed.

In the illustrated embodiment of FIG. 7, the previous value of R(n), i.e. R(n−1), was used to adjust $c_0(n)$. However, in an alternate embodiment, only the current value of R(n) and its quantized reference values Q(R(n)), illustrated by one of 232, 234, 236 or 238 on FIG. 12, are used such that the distance between R(n) and Q(R(n)) is minimized (e.g. by minimizing $E'(n)=R(n)Q(R(n))^*$, which corresponds to replacing delay units 140 and 142 with a quantizer similar to the one illustrated on FIG. 12). In yet another alternate embodiment, no feedback may be used. That is, a one-shot feed-forward system may be used. For example, the frequency estimator $\rho_\Omega(n)$ may be used to adjust $c_0(n)$, such that $C_0(n)=\text{sign}(\pi/2-\Omega)\sqrt{\rho_\Omega(n)}$ where the square root can be approximated by a polynomial. However, this is not as smooth as the illustrated embodiment. Therefore, a variety of different methods may be used to set $c_0(n)$. In one embodiment, an optional magnitude estimator that takes $c_0(n)$ and generates $\rho_A'$ 141 to single component phase detector decision unit 158 may optionally be included in FIG. 7. In this case, the output of multiplier 145 corresponds to $P(n)/[1-c_o^2(n)]$, which approximates $A^2$ if k=1 in Equation 2. LPF 143 receives b and the output of multiplier 145, and generates a smooth estimate $\rho_A'$ 141, which can be used as an amplitude or magnitude detector within single component phase detector unit 158.

Single component phase detector decision unit 158, based on the received values of $c(n)$ and $s(n)$ (and $c_0(n)$ and $\rho_A$ if needed) can then provide tone characteristics to decision logic and control 44 via conductors 42. The values of $c(n)$ and $s(n)$ may be provided directly to decision logic and control 44, or a tone characteristic derived from these values, which, for example, indicates a phase tone characteristic, may be provided to decision logic control 44. Note that single component phase detector decision unit 158 will be described in more detail in reference FIG. 12 below which illustrates one embodiment of a portion of decision unit 158.

FIG. 8 illustrates one embodiment of multicomponent tone detector 74 of FIG. 5. The illustrated embodiment receives $x(n)$ 30 and provides frequency and amplitude information, $\rho_\Omega$ and $\rho_A$, for each of the tone components included in $x(n)$ 30 to multicomponent tone detection decision unit 172. For example, multicomponent tone detector 74 includes N filters capable of providing phase and amplitude information for N components of $x(n)$. Input signal $x(n)$ 30 is provided to filter$_1$ 162 through filter$_N$ 164, and then to AM-FM demodulator$_1$ 166 through AM-FM demodulator$_N$ 168, respectively. Each of AM-FM demodulator$_1$ 166 through AM-FM demodulator$_N$ 168 provides values for $\hat{\rho}_{\Omega_1}, \hat{\rho}_{A_1}$ through $\hat{\rho}_{\Omega_N}, \hat{\rho}_{A_1}$ respectively. Detector 74 can therefore have any number of filters and AM-FM demodulators as needed. Generally, one filter and AM-FM demodulator is needed for every frequency component of a tone within a particular tone format. For example, in the DTMF format where each symbol has two frequency components, one filter and one AM-FM demodulator is used for each frequency component (one for the high frequency component and one for the low frequency component). Each filter provides a signal containing the desired frequency to its corresponding AM-FM demodulator. The corresponding AM-FM demodulator produces measured or estimated values of $\rho_{\Omega_1}$ and $\rho_{\Omega_2}$ (the measured or estimated values denoted as $\hat{\rho}_{\Omega_1}$ and $\hat{\rho}_{\Omega_2}$) based on the current received sample of $x(n)$ and on a current estimated DTMF code value, $\mu_f(n)$ (which corresponds to the decoded frequency values of $x(n)$). These estimated values $\hat{\rho}_{\Omega_1}$ and $\hat{\rho}_{\Omega_2}$ and the stored tables corresponding to the DTMF tone format are then used by self-tuning unit 36 to determine a next estimated DTMF code value $(\mu_f(n+1))$, which is provided to multicomponent tone detection decision unit 172 and fed back to filter$_1$ 28 through filter$_N$ 32 for use with the next received sample of x(n).

Note that in equation 17 above, x(n) is composed of one frequency; however, the Teager-Kaiser energy operator described above in reference to tone indicator 32 of FIG. 2 can be extended to cover the case where x(n) is composed by more than one frequency. In this case, $$x(n) = \sum_{i=1}^{N} A_i \cos(n\Omega_i + \phi_i),$$

such that $$\psi_k(x(n)) = \sum_{i=1}^{N} A_i^2 \sin^2(k\Omega_i) + \varphi(n, \Omega_1, \ldots, \Omega_N)$$

where the function $\phi(\bullet)$ makes the energy operator time-varying, thus imposing additional difficulty to separate the N components.

Therefore, this energy operator (represented as P(n) 38 from tone indicator 32) may be used to detect multiple components by first filtering the signal x(n) with N independent filters such that every component $x_c(n)$ can be efficiently extracted. Once the N components are extracted, their frequency and magnitude estimates ($\hat{\rho}_{\Omega_1}$ and $\hat{\rho}_{A_1}$) are computed.

Filter$_1$ 162 filters x(n) such that a first component $x_c(n)$ can be extracted. Similarly, filter$_N$ filters x(n) such that an $N^{th}$ component $x_N(n)$ can be extracted. Therefore, each filter is used to extract a corresponding component $x_c(n)$, also referred to as a tone component. (Therefore, in the case of a tone format in which each tone includes N=5 components, 5 filters are present where each is used to extract a corresponding tone component.) Once the components are extracted, $\hat{\rho}_{\Omega_1}$ through $\hat{\rho}_{\Omega_N}$ are determined. For example, in one embodiment, comb filters are used for each of filter$_1$ through filter$_N$ such that a given filtering path removes all the undesirable components from the other paths.

In this manner, each AM-FM demodulator calculates its corresponding value of $\hat{\rho}_\Omega$ without other frequency components of the tone corresponding to the current value of $\mu_f(n)$ being present. Therefore, a comb filter for each filter$_c$ (c= 1, . . . , N) can have a general format as shown below in equation 24.

$$H_c^{(m)}(z) = \Gamma_c^{(m)} \prod_{i \neq c, i=1}^{N} \frac{1 - b_{i,j} z^{-1} + z^{-2}}{1 - r b_{i,j} z^{-1} + r^2 z^{-2}}, c = 1, \cdots, N \quad \text{Equation 24}$$

In the above equation, 0<r<1, and a product term exists for each of i=1 to N, for i≠c. According to the above equation, if a tone format has L frequency components, then each filter's transfer function, H, would include a product of L−1 terms. Note that in the current embodiment, the coefficients of the comb filters are adaptive and therefore change depending on the current value of $\mu_f(n)$.

In one embodiment, $\Gamma_c^{(m)}$ is chosen such that $|H_c^{(m)} (e^{j\Omega_{c,j}})|=1$, i.e. the removal of the unwanted components i≠c does not introduce gain bias on the target component c. It can be shown that:

$$\Gamma_c^{(m)} = \sqrt{\prod_{i \neq c} \frac{\left(\frac{1-r^2}{2}\right)^2 - r[r\cos(\Omega_{c,j}) - \cos(\Omega_{i,j})][r\cos(\Omega_{i,j}) - \cos(\Omega_{c,j})]}{[\cos(\Omega_{c,j}) - \cos(\Omega_{i,j})]^2}}$$

For the two-component case (N=2), note that $\Gamma_1^{(m)} = \Gamma_2^{(m)}$, $\forall m$. The values of $\Gamma_c^{(m)}$ and the coefficients $b_{c,j}$, c= 1, . . . , N, can be pre-computed and stored in a look-up table. If magnitude estimations are not used, the gains $\Gamma_c^{(m)}$ may be ignored.

In order to successfully detect a given multi-component tone, a self-tuning mechanism is used for searching the optimal set of frequencies that minimizes variability of the frequency detector outputs. This is so because a single frequency tone generates a constant value after being processed by the Teager-Kaiser energy operator. The operation of self-tuning unit 170 uses the current value of $\mu_f(n)$ to adjust the coefficients of filter$_1$ through filter$_N$ so that the next sample of x(n) 30 is processed assuming that it will generate the same value of $\mu_f(n)$. If the actual segment identification value of x(n) 30 corresponds to $\mu_f(n)$, this will lead to correct estimation of the signal components thereby resulting in frequency lock of the self-tuning unit 170. On the other hand, if the actual segment identification value of x(n) 30 does not correspond to $\mu_f(n)$, the self-tuning unit 170 will continue to adjust the coefficients of filter$_1$ through filter$_N$ until a frequency lock is obtained. In one embodiment, decoded frequency values $\mu_f(n)$ are estimated according to FIG. 11, in which the closest reference frequency estimates determine the coefficients of filter$_1$ through filter$_N$ to be used for processing the next sample of x(n) 30, such that the corresponding reference frequency values are notched by filter$_1$ through filter$_N$.

FIGS. 9 through 12 illustrate various portions which may be included in single component frequency detector decision unit 90 (or in single component phase detector decision unit 158 or in multicomponent tone detection decision unit 172, or in any two or more of units 90, 158, and 172, as needed). For example, the embodiment of FIG. 9 (which may, for example, be included in unit 90 or 158 or both) provides a tone characteristic, $\mu_{on-off}(n)$, which indicates decoded on-off modulation information. The embodiment of FIG. 10 (which may also be used in unit 90 or 158 or both) provides a tone characteristic $\mu_{AM}(n)$ which indicates the decoded AM modulating frequency. The embodiment of FIG. 11 (which may be used in unit 90, 158, or 172, or in any two or more of these units) provides a tone characteristic $\mu_f(n)$ which indicates the decoded frequency of the tone on x(n) 30. Therefore, depending on which tone formats are supported by bank of dependent tone detectors 40, additional, fewer, or different types of tone characteristics may be provided to decision logic and control unit 44. Note that the embodiment of FIG. 11 may apply to both single tone components and multiple tone components on x(n). In the case of multiple components, FIG. 11 may provide a tone characteristic $\mu_f(n)$ for each of the tone components which indicates the decoded frequency of the tone components of x(n). Also, FIG. 12 illustrates one embodiment which may be included in single component phase detector decision unit 158 of FIG. 7 and provides a tone characteristic $\mu_p(n)$ which indicates a decoded phase. Furthermore, note that, as will be described below, the outputs of FIGS. 9-12 are integer outputs which are easy to work with and allow a common logic to be used by decision logic and control unit 44 to determine if a valid tone event has occurred.

FIG. 9 illustrates one embodiment of a portion of single component frequency detector decision unit 90. FIG. 9 can be used to provide a decoded on-off magnitude indicator, $\mu_{on\text{-}off}$(n), as a tone characteristic. If input signals x(n) 30 is modulated according to an on-off modulation (such as used in, for example, CNG and CT), then single component frequency detector decision unit 90 may include the items of FIG. 9. As illustrated in FIG. 9, P(n) 38 is provided to a positive input of adder 174 and a threshold $P_{low}$ is provided to a negative input of adder 174. The output of adder 174 ("P(n)−$P_{low}$") is provided to step function 176 which outputs $\mu_{on\text{-}off}$(n) as a 1 if P(n)>$P_{low}$ or a 0 if P(n)≦$P_{low}$. This tone characteristic is then provided to decision logic and control unit 44.

FIG. 10 illustrates one embodiment of a portion of single component frequency detector decision unit 90 which may be used in addition to or instead of FIG. 9. FIG. 10 can be used to provide an AM modulating frequency tone characteristic, $\mu_{AM}$(n). P(n) 38 or PA 92 (or $\rho_A'$ 141, if implemented as a portion of single component phase detector decision unit 158) is provided to DC offset estimation and compensation unit 178 which identifies and removes a DC offset in its input signal. In one embodiment, one period of the AM modulating frequency is employed to define the DC offset as the average between the maximum and minimum values of the given input signal (within one period). The estimated DC offset is then subtracted from the input signal to generate the output of 178. The output of DC offset estimation and compensation unit is provided to zero crossing counter 180 which maintains a count of zero crossings. The output is provided to adder 182 which also receives the negative of $NZ_{max}$. The output of adder 182 is provided to step function 184 which outputs a 1 if the number of zero crossings determined by zero crossing counter 180 is >$NZ_{max}$ and a 0 if not. Therefore, the outputs of 0 or 1 according to the elements of FIG. 10 provide an indication of the AM modulating frequency which is provided as $\mu_{AM}$(n) to decision logic and control unit 44. In one embodiment, a non-zero number of zero crossings smaller than $NZ_{max}$ (i.e. $\mu_{AM}$(n)=0) within a predetermined number of samples indicates a possible match of the AM modulating frequency. FIG. 10 may be used, for example, for detecting ANSam and ANSam_PR tone events.

FIG. 11 illustrates an embodiment of a portion of single component frequency detector decision unit 90 and multicomponent tone detection decision unit 172. In one embodiment, this portion is always enabled upon tone indication and, based on its output, determines whether FIG. 9, 10, or 12 need to be enabled. Therefore, in the illustrated embodiment, each of FIGS. 9-12 can be independently enabled or disabled as needed upon detecting the presence of a tone on x(n) 30. Signal $\rho_\Omega$(n) (which may be a single value, such as $\rho_\Omega$ from LPF 86 in FIG. 6 or a vector of values, such as the outputs of demodulators 166-168 of FIG. 8) is provided to an adder, such as adder 186. The number of adders on FIG. 11 depends on the number of different tones (having either single frequency or multiple frequency components) to be detected. Each value of $\rho_\Omega$(n) (also referred to as a frequency estimator value) is added with the negative of a corresponding reference value $\rho_{\Omega ref1}$ through $\rho_{\Omega refN}$ (also referred to as reference frequency estimator values). The results are provided to a corresponding L-norm of L-norm 192 to 196. In one embodiment, the $L_1$ norm is used to generate the outputs of 192 to 196, which indicate the distance between $\rho_\Omega$(n) and each one of the reference values. The estimated distance values are provided to arg min 198 which provides the index (one of 1 to N) of the minimum branch from each of the L-norms 192 to 196 as $\mu_f$(n). Therefore, as with the other tone characteristics, note that $\mu_f$(n) is also output as an integer (1 to N) as is $\mu_{AM}$(n) and $\mu_{on\text{-}off}$(n). In one embodiment, $\mu_f$(n) is determined for each incoming sample of x(n) 30 where, upon determining $\mu_f$(n), other portions of the decision units (such as FIGS. 9, 10, and 12) may be enabled as needed, based on the value of $\mu_f$(n). For example, a phase detector may be enabled upon occurrence of some values of $\mu_f$(n). In an alternative embodiment, the frequency decoder illustrated in FIG. 11 may be implemented within single component phase detector decision unit 158. In this case, $c_0$(n) may be used to directly decode the frequency (i.e. $\rho_\Omega$(n) is replaced with $c_0$(n) and $\rho_{\Omega refm}$ is replaced with $c_{0refm}$, m=1, . . . N).

FIG. 12 illustrates an embodiment of a portion of single component phase detector decision unit 158 which, based on c(n) and s(n) (from LPFs 136 and 138 of FIG. 7, respectively) provides a decoded phase tone characteristic $\mu_p$(n) 226. As seen in the chart of FIG. 12 where c(n) corresponds to the x axis 228 and s(n) corresponds to the y axis 230, depending in which quadrant determined by dotted lines 240 and 242 the values of c(n) and s(n) fall for each sample of x(n), the phase is quantized to one of 0, 1, 2, and 3 (corresponding to points 232, 234, 236, and 238, respectively, in FIG. 12). For example, if c(n) and s(n) are values such that when (c(n), s(n)) is graphed using axes 228 and 230, it falls in region 226 between dotted lines 242 and 240 in the left half of the graph, output $\mu_p$(n) is set to 2.

Referring to FIG. 12, c(n) is provided to an absolute value 200 which provides the magnitude of c(n) to adder 202. Signal c(n) is also provided to step function 206 which provides its output to adder 212. Signal s(n) is provided to absolute value 204 which provides the magnitude of s(n) to a negative input of adder 202 where adder 202 provides "|c(n)|−|s(n)|" to step function 208. Signal s(n) is also provided to step function 210. Each of step functions 206, 208, and 210 outputs a 1 for positive inputs and a 0 otherwise. Therefore, the output of adder 212 can be 0, 1, or 2. The output of adder 212 is multiplied by −2 by multiplier 214 which provides the result (0, −2, or −4) to adder 216. Adder 216 adds 1 to the result of multiplier 214 (to obtain 1, −1, or −3) and provides it to multiplier 218. The output of step function 210 is provided to multiplier 222 which multiplies this output by 2 and provides the result to adder 220. Therefore, the result of multiplier 222 may be 0 or 2 which is provided to adder 220. Adder 220 adds 1 to obtain 1 or 3 which is then provided to adder 224. Multiplier 218 receives the output of adder 216 and the output of step function 208 and provides the result (0, 1, −1, or −3) to adder 224, which provides $\mu_p$(n) as one of 0 through 3. Note that FIG. 12 may be used when decoded phase information is needed, such as, for example, in detecting tone formats such as ANS_PR, ANSam_PR, and USB1. Also note that in alternate embodiments, any number of decision boundaries may be used to quantize $\mu_p$(n). That is, $\mu_p$(n) may be quantized into more or less than the 4 points illustrated in FIG. 12. Therefore, the logic of FIG. 12 can be designed in a variety of ways depending on the desired quantization of $\mu_p$(n).

Any of the tone characteristics may also be provided from decision logic and control unit 44 back to any detector within bank of dependent detectors 40. For example, they may be provided back in order to reset themselves, such as, for example, in cases where they exceed allowable tolerances. Also, in one embodiment, the control signal $c_0$(n) of FIG. 7, which can also be used as a frequency estimate of x(n) 30, may be used in conjunction with $\rho_\Omega$(n) to validate detection of a given tone. For example, the sign of $c_0$(n) indicates whether the frequency of a given tone is smaller or greater than 25% of the sampling rate. More specifically, for a sampling rate of 8 KHz, two single component tones having frequencies 1900 Hz and 2100 Hz have the same value of $\rho_{c2}(n)$, whereas $c_0(n)$ is positive for 1900 Hz (smaller than 2000 Hz) and negative for 2100 Hz (greater than 2000 Hz). Also note that FIGS. 9-12 illustrated only some example of possible tone characteristics while alternate embodiments may use other methods in addition to or in place of any of FIGS. 9-12 to provide additional or different types of tone characteristics. For example, other types of frequency information, phase information, timing information, or magnitude information may be provided, and they may be generated in a variety of different ways.

Figure 17:
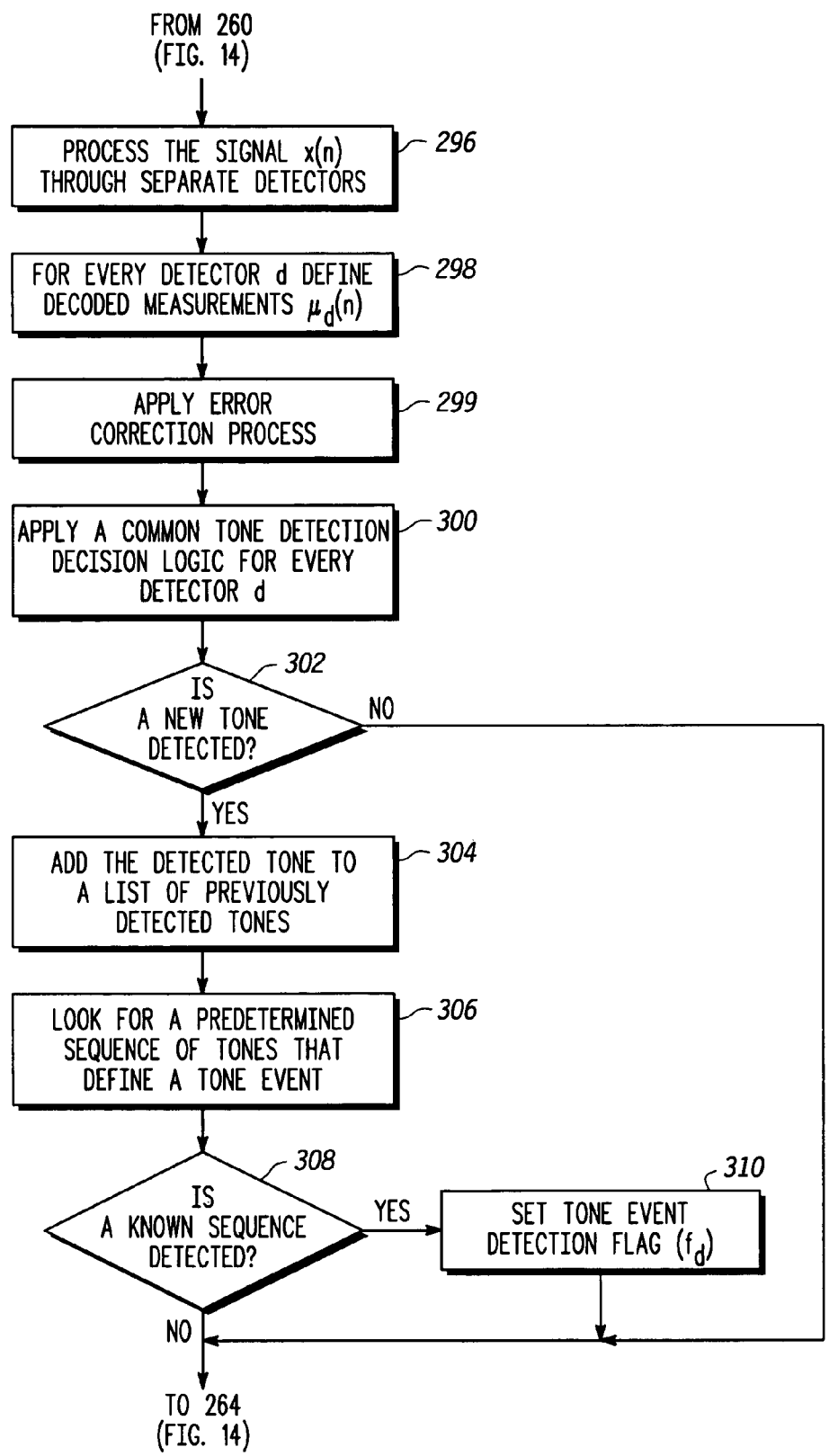
FIG. 17 illustrates, in flow diagram form, a method for applying a bank of dependent tone detectors in accordance with one embodiment of the present invention.

Once the tone characteristics are determined and provided as integer values to decision logic and control unit 44, decision logic and control unit 44 can apply a common logic scheme to determine whether a valid tone event is detected. FIG. 17 illustrates a method of detecting a tone event in accordance with one embodiment of the present invention which illustrates one embodiment of block 262 of FIG. 14 in which the bank of dependent tone detectors is applied.

The flow of FIG. 17 begins with block 296 where signal $x(n)$ is processed through separate detectors such as, for example, detectors 70, 72, and 74 of FIG. 5. (Note that any number and type of detectors may be used in different embodiments.) Flow then proceeds to block 298 where for every detector d, a decoded tone characteristic $\mu_d(n)$ is determined. For example, in the embodiments of FIGS. 9-12, $\mu_d(n)$ includes $\mu_f(n)$, $\mu_{AM}(n)$, $\mu_{on-off}(n)$, and $\mu_p(n)$. Note that, as described above, not every detector may provide a tone characteristic for each sample of $x(n)$. For example, detectors may only be enabled as needed, such as in one embodiment described above, where some tone characteristics (e.g. $\mu_{AM}(n)$, $\mu_{on-off}(n)$, and $\mu_p(n)$) are estimated only if needed (e.g. as determined by $\mu_f(n)$). Flow proceeds to block 299 where possible characteristic errors are detected and corrected, if possible, as will be explained in relation to FIG. 18. Flow continues to 300 where a common tone detection decision logic is applied for every detector d. That is, through the use of the integer tone characteristics, a common decision logic may be used for the different detectors. Alternate embodiments may provide tone characteristics in different formats and may include different detection decision logic. Flow then proceeds to decision diamond 302 where it is determined if a new tone is detected based on the tone characteristics. If not, flow proceeds to block 264 of FIG. 14.

If, at decision diamond 302, a new tone is detected, flow proceeds to block 304 where the detected tone is added to a list of previously detected tones. Flow then proceeds to block 306 where the list can be examined to look for a predetermined sequence of tones that define a tone event. For example, decision logic and control unit 44 may include a table of tone events which define the different tone events that can be detected, and based on the current sequence of tones on the list and the table of tone events, a valid tone event can be detected. Therefore, flow proceeds to decision diamond 308 where it is determined whether a known sequence is detected. If so, flow proceeds to block 310 where the tone event detection flag $f_d$ is set. Otherwise, flow proceeds to block 264 of FIG. 14. Decision logic and control unit can then assert detected tone event 45 to indicate that a valid tone has been detected and provide the desired information relating to the detected tone event to control bus 22. Note that in the process of detecting a known sequence, the tone detection flag may be set to indicate that an invalid tone event has been detected, in which case a tone event is not reported. For example, a TTY tone event must have a maximum of 7 tone, starting and stopping with a specific tone; if more or less tones are provided to tone event detector 14 of FIG. 2, they will not result in a TTY tone event detection.

Figure 18:
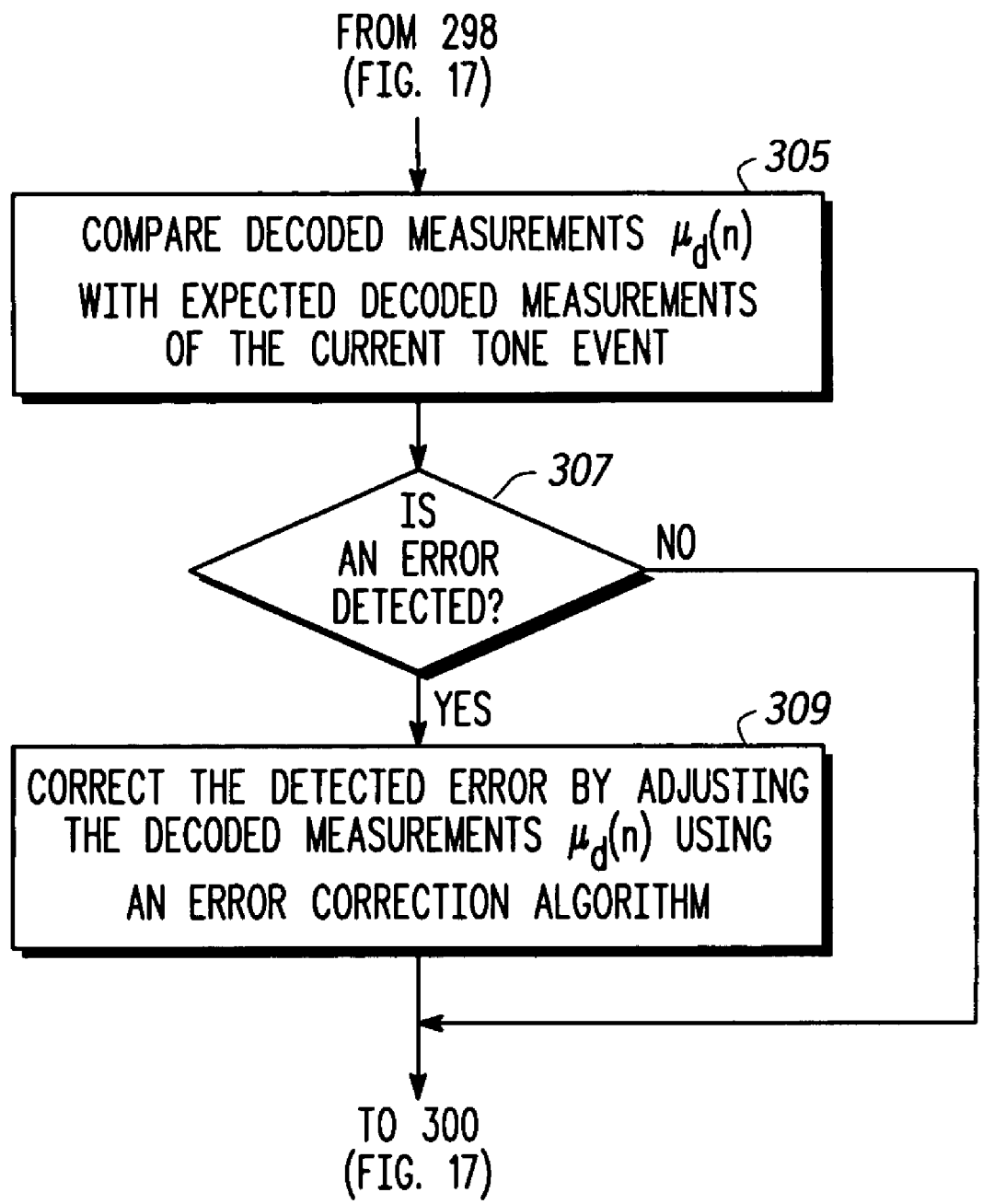
FIG. 18 illustrates, in flow diagram form, a method for error correction in accordance with one embodiment of the present invention.

FIG. 18 represents one embodiment of the error correction process in block 299 of FIG. 17. Once decoded tone characteristics $\mu_d(n)$ are estimated, flow proceeds to block 305 where the values of $\mu_d(n)$ are compared with expected decoded measurements of the current tone event. For example, for a TTY tone event, the tone segments must have one of two specific values of $\mu_f(n)$; therefore, if a different value of $\mu_f(n)$ is estimated, it would indicate an error. Decision diamond 307 then checks whether an error is detected and proceeds to block 300 on FIG. 17 if no errors are detected. Otherwise, decision diamond 307 proceeds to block 309 where the detected error is corrected by adjusting affected tone characteristics $\mu_d(n)$ using an error correction algorithm prior to providing the decoded tone characteristics $\mu_d(n)$ to block 300 of FIG. 17. In one embodiment, this error correction may be used to overcome possible conflicting requirements, for example, in terms of frequency tolerance. In the above TTY tone event example, the error correction algorithm could be defined as follows: if a specific decoded frequency $\mu_f(n)$ is estimated and its value is different than any of the expected TTY decoded frequencies, then $\mu_f(n)$ would be replaced with the expected TTY decoded frequency value corresponding to the closest TTY frequency to the estimated value of $\mu_f(n)$. The error correction algorithm can also be used to verify predefined tolerances of the tone characteristics so that if a given characteristic is out of specification, the corresponding decoded measurement $\mu_d(n)$ is invalidated. For example, if the frequency tolerance is out of specification, $\mu_f(n)$ may be replaced with 0 (i.e. reset), which indicates an invalid frequency component.

Figure 19:
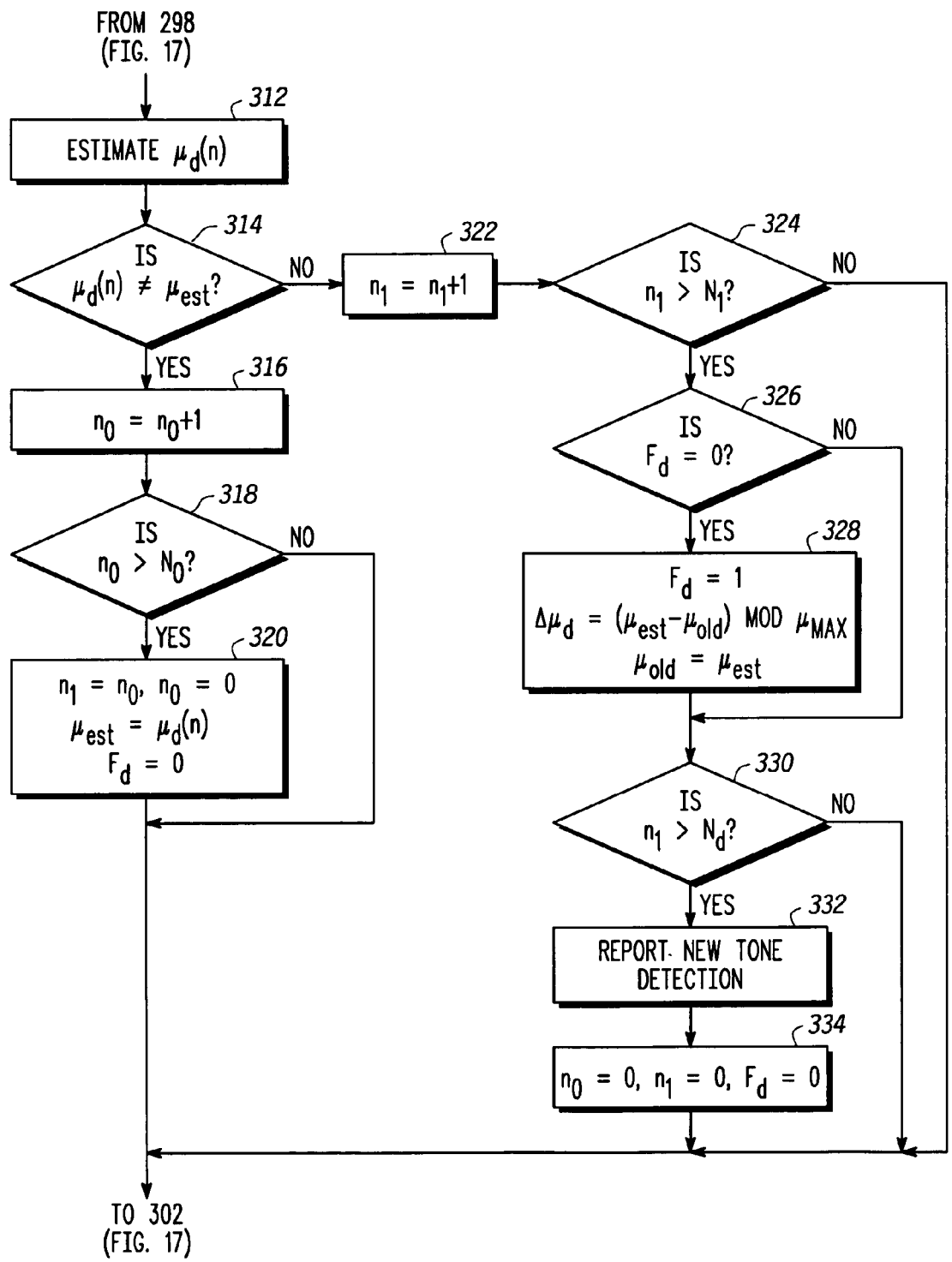
FIG. 19 illustrates, in flow diagram form, a method for applying tone detection decision logic in accordance with one embodiment of the present invention.

FIG. 19 illustrates a flow corresponding to one embodiment of block 300 of the flow of FIG. 17 in which a common tone detection decision logic is applied. The flow of FIG. 19 determines whether a transition to a given integer value has occurred and whether the value is maintained for a predetermined time (greater than $N_d$). Flow begins with block 312 where $\mu_d(n)$ is estimated ($\mu_d(n)$ indicates one of $\mu_f(n)$, $\mu_{AM}(n)$, $\mu_{on-off}(n)$, and $\mu_p(n)$). Flow then proceeds to decision diamond 314 where it is determined whether $\mu_d(n)$ is not equal to $\mu_{est}$ which may correspond to a previous value of $\mu_d(n)$. If $\mu_d(n)$ is not equal to $\mu_{est}$, then flow proceeds to block 316 where $n_0$ (which was previously initialized to 0) is incremented by one. Flow then proceeds to decision diamond 318 where it is determined whether $n_0$ is greater than $N_0$. If not, flow proceeds to decision diamond 302 of FIG. 17. If so, flow proceeds to block 320, where $n_1$ is set to $n_0$, $n_0$ is set to 0, $\mu_{est}$ is set to $\mu_d(n)$ and $F_d$ is set to 0. Flow then proceeds to decision diamond 302 of FIG. 17.

If at decision diamond 314, $\mu_d(n)$ is equal to $\mu_{est}$, flow proceeds to block 322 where $n_1$ is incremented by one. Flow then proceeds to decision diamond 324 where it is determined whether $n_1$ is greater than $N_1$. If not, flow proceeds to decision diamond 330. If so, flow proceeds to decision diamond 326 where it is determined whether $F_d=0$. If so, flow proceeds to block 328 where $F_d$ is set to 1, the change in $\mu_d$ ($\Delta\mu_d$) is set to $(\mu_{est}-\mu_{old})$ MOD $\mu_{max}$, and $\mu_{old}$ is set to $\mu_{est}$ (in one embodiment, $\Delta\mu_d=\Delta\mu_p$ is used for detecting tone events having DPSK modulated segments). Flow then proceeds to decision diamond 330 where it is determined whether $n_1$ is greater than $N_d$. If not, flow proceeds to block 302 of FIG. 17. If so, flow proceeds to block 332 where a new tone detection is reported. Flow proceeds to block 334 where $n_0$, $n_1$, and $F_d$ are all reset to 0. Flow then proceeds to block 302 of FIG. 17. In the above description, $n_0$ and $n_1$ are counters used to indicate a transition or edge on the decoded tone characteristic ($\mu_d(n)$ is not equal to $\mu_{est}$) and a possible plateau of constant values ($\mu_d(n)$ is equal to $\mu_{est}$), respectively. In the illustrated embodiment, $N_0$ is the minimum number of samples required to define a transition to a new tone segment, $N_1$ is the minimum number of samples required to indicate a likely tone segment, and $N_d > N_1$ is the minimum number of samples required to validate a new tone detection. Also, in the illustrated embodiment, $F_d$ is a detection flag used to control the time when $\Delta\mu_d$ and $\mu_{old}$ are estimated. In the current embodiment, note that $N_0$, $N_1$, $N_d$ and $\mu_{MAX}$ depend on $\mu_d(n)$, such that different tones can have their corresponding values ($N_0$, $N_1$, $N_d$ and $\mu_{MAX}$) according to some predetermined specification.

Tone event detector 14 can be implemented in hardware, software, firmware, or any combination thereof. For example, the block diagrams as well as the flow diagrams in FIGS. 1-19 can be performed in software, hardware, firmware, or in any combination thereof.

In the foregoing specification, the invention has been described with reference to specific embodiments. However, one of ordinary skill in the art appreciates that various modifications and changes can be made without departing from the scope of the present invention as set forth in the claims below. For example, any of the methods taught herein may be embodied as software on one or more of computer hard disks, floppy disks, 3.5" disks, computer storage tapes, magnetic drums, static random access memory (SRAM) cells, dynamic random access memory (DRAM) cells, electrically erasable (EEPROM, EPROM, flash) cells, nonvolatile cells, ferroelectric or ferromagnetic memory, compact disks (CDs), laser disks, optical disks, and any like computer readable media. Also, the block diagrams may have different blocks than those illustrated and may have more or less blocks or be arranged differently. Also, the flow diagrams may also be arranged differently, include more or less steps, be arranged differently, or may have steps that can be separated into multiple steps or steps that can be performed simultaneously with one another. Accordingly, the specification and figures are to be regarded in an illustrative rather than a restrictive sense, and all such modifications are intended to be included within the scope of present invention.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

The invention claimed is:

1. In a tone event detector implemented at least partially in hardware and having a tone indicator, at least one tone detector, and a control unit, a method for performing tone event detection comprising:

receiving, at an input of said tone event detector, a sampled input signal;

determining, by said tone indicator, if at least one tone has been indicated based on said sampled input signal and providing a tone indication signal in response thereto, wherein said determining if said at least one tone has been indicated comprises detecting whether a tone of any frequency is present, and further comprises:

determining an energy estimation of said sampled input signal;

determining whether at least one segment of said energy estimation has a variance of less than a predetermined amount of variance for a predetermined duration;

when said at least one segment has said variance of less than said predetermined amount of variance for said predetermined duration, asserting said tone indication signal to indicate that said at least one tone has been indicated and providing said sampled input signal to said at least one tone detector to determine whether at least one tone has been detected;

selectively determining, by said at least one tone detector, in response to said tone indication signal, whether at least one tone has been detected, wherein selectively determining comprises:

determining whether at least one tone has been detected when said at least one tone has been indicated, wherein said determining whether at least one tone has been detected comprises identifying a frequency of said tone of any frequency; and bypassing determining whether at least one tone has been detected when said at least one tone has not been indicated; and when at least one tone has been detected, determining, by said control unit, whether said at least one tone corresponds to a tone event.

2. The method of claim 1, wherein said sampled input signal has a multiple frequency tone format.

3. The method of claim 1, further comprising pre-processing said sampled input signal.

4. The method of claim 1, wherein said sampled input signal is sampled at 8 kHz.

5. The method of claim 1, further comprising modulating said sampled input signal using at least one of frequency shift keying modulation, phase shift keying modulation, differential phase shift keying modulation, amplitude modulation, and multiple component frequency modulation.

6. The method of claim 1, wherein said determining whether at least one tone has been detected comprises using said sampled input signal to generate a first tone characteristic value which provides at least one of frequency information, phase information, timing information, and magnitude information, and wherein said determining whether said at least one tone corresponds to a tone event comprises using said first tone characteristic to determine whether said at least one tone is a tone event.

7. The method of claim 6, further comprising:

selectively adjusting said first tone characteristic value to correct at least one of a phase error, a frequency error, and a magnitude error in said first tone characteristic value.

8. The method of claim 7, wherein said selectively adjusting said first tone characteristic value to correct at least one of a phase error, a frequency error, and a magnitude error in said first tone characteristic value comprises:

comparing said first tone characteristic value to an expected tone characteristic value, wherein said expected tone characteristic value corresponds to a previous tone characteristic value;

based on said comparing, selectively adjusting said first tone characteristic value.

9. The method of claim 1, wherein said determining whether at least one tone has been detected comprises using said sampled input signal to generate a plurality of tone characteristics values, each of the plurality of tone characteristic values providing at least one of frequency information, phase information, timing information, and magnitude information, and wherein said determining whether said at least one tone corresponds to a tone event comprises using at least a portion of said plurality of tone characteristic values to determine whether said at least one tone is a tone event.

10. The method of claim 1, wherein said determining whether at least one tone has been detected comprises determining at least one of a plurality of characteristics, said at least one of a plurality of characteristics comprising at least one of frequency information, phase information, and magnitude information.

11. The method of claim 1, wherein said determining whether at least one tone has been detected comprises:
using said sampled input signal to generate a first tone characteristic value, said first tone characteristic value corresponding to at least one segment of said sampled input signal.

12. The method of claim 11, wherein said first tone characteristic value is used to reset itself.

13. The method of claim 11, further comprising comparing a frequency estimator value to a plurality of reference frequency estimator values and providing said first tone characteristic value based on said comparison between said frequency estimator value and said plurality of reference frequency estimator values.

14. The method of claim 11, wherein said first tone characteristic value provides at least one of frequency information, phase information, timing information, and magnitude information.

15. The method of claim 11, further comprising determining whether said first tone indicator remains constant over a predetermined period of time.

16. The method of claim 15, wherein determining whether said at least one tone is a tone event comprises using said first tone characteristic value to determine whether said at least one tone is a tone event.

17. The method of claim 11, further comprising:
selectively adjusting said first tone characteristic value to correct at least one of a phase error, a frequency error, and a magnitude error in said first tone characteristic value.

18. The method of claim 17, wherein said selectively adjusting said first tone characteristic value to correct at least one of a phase error, a frequency error, and a magnitude error in said first tone characteristic value comprises:
comparing said first tone characteristic value to an expected tone characteristic value, wherein said expected tone characteristic value corresponds to a previous tone characteristic value;
based on said comparing, selectively adjusting said first tone characteristic value.

19. A tone event detector implemented at least partially in hardware, comprising:
a tone indicator coupled to receive a sampled input signal, said tone indicator for determining if at least one tone has been indicated based on said sampled input signal wherein said determining by the tone indicator comprises detecting whether a tone of any frequency is present, and wherein said determining by the tone indicator further comprises:
determining an energy estimation of said sampled input signal;
determining whether at least one segment of said energy estimation has a variance of less than a predetermined amount of variance for a predetermined duration;
when said at least one segment has said variance of less than said predetermined amount of variance for said predetermined duration, asserting said tone indication signal to indicate that said at least one tone has been indicated and providing said sampled input signal to said at least one tone detector to determine whether at least one tone has been detected; and at least one tone detector coupled to said tone indicator, said at least one tone detector coupled to receive said sampled input signal, said at least one tone detector for determining whether at least one tone has been detected when said at least one tone has been indicated, wherein said determining by said at least one tone detector comprises identifying a frequency of said tone of any frequency, and wherein said at least one tone detector is bypassed when said at least one tone has not been indicated; and control logic coupled to said tone indicator and said at least one tone detector, said control logic determining whether said at least one tone corresponds to a tone event when at least one tone has been detected.

20. The tone event detector of claim 19, wherein said at least one tone detector comprises at least one of a single component frequency detector, a single component phase detector, or a multicomponent tone detector.

21. The tone event detector of claim 19, wherein said control logic unit is used to control said at least one tone detector.

22. The tone event detector of claim 19, wherein said control logic unit receives at least one tone characteristic from said at least one tone detector to determine whether said at least one tone corresponds to a tone event, wherein said at least one tone characteristic comprises at least one of frequency information, phase information, or magnitude information.

23. The tone event detector of claim 22, wherein said tone indicator determines an energy estimation of said sampled input signal and determines whether at least one segment of said energy estimation has a variance within a predetermined range of variance for a predetermined duration in order to provide said sampled input signal to at least one said tone detector.

24. A tone event detector a method stored via a computer readable medium, wherein said computer readable medium comprises a plurality of instructions, which, when executed by a data processing system, causes the data processing system perform a method comprising:
receiving a sampled input signal;
determining if at least one tone has been indicated based on said sampled input signal, wherein said determining if said at least one tone has been indicated comprises detecting whether a tone of any frequency is present and further comprises:
determining an energy estimation of said sampled input signal;
determining whether at least one segment of said energy estimation has a variance of less than a predetermined amount of variance for a predetermined duration;
when said at least one segment has said variance of less than said predetermined amount of variance for said predetermined duration, asserting said tone indication signal to indicate that said at least one tone has been indicated and providing said sampled input signal to said at least one tone detector to determine whether at least one tone has been detected;

selectively determining whether at least one tone has been detected, wherein selectively determining comprises:
determining whether at least one tone has been detected when said at least one tone has been indicated, wherein said determining whether at least one tone has been detected comprises identifying a frequency of said tone of any frequency; and bypassing determining whether at least one tone has been detected when said at least one tone has not been indicated; and determining whether said at least one tone corresponds to a tone event when at least one tone has been detected.

* * * * *